(12) United States Patent  
Shigemura et al.

(10) Patent No.: US 8,041,910 B2  
(45) Date of Patent: Oct. 18, 2011

(54) STORAGE APPARATUS AND CONTROL METHOD THEREOF

(75) Inventors: Takeshi Shigemura, Odawara (JP); Koji Nagata, Kaisei (JP); Kosuke Sakai, Isehara (JP)

(73) Assignee: Hitachi, Ltd., Tokyo (JP)

( * ) Notice: Subject to any disclaimer, the term of this patent is extended or adjusted under 35 U.S.C. 154(b) by 594 days.

(21) Appl. No.: 12/130,056

(22) Filed: May 30, 2008

(65) Prior Publication Data

US 2009/0228671 A1 Sep. 10, 2009

(30) Foreign Application Priority Data

Mar. 4, 2008 (JP) ................................. 2008-053729

(51) Int. Cl.  
*G06F 12/00* (2006.01)

(52) U.S. Cl. ........................................ 711/162; 711/168

(58) Field of Classification Search .................... 711/162  
See application file for complete search history.

(56) References Cited

U.S. PATENT DOCUMENTS

| 7,114,046 B2 | 9/2006 | Ido et al. |
| 7,617,372 B1 | 11/2009 | Bjornsson et al. |
| 7,702,851 B2 | 4/2010 | Satoyama et al. |
| 2006/0005074 A1* | 1/2006 | Yanai et al. ........................ 714/5 |
| 2006/0020754 A1 | 1/2006 | Suzuki et al. |

FOREIGN PATENT DOCUMENTS

JP 2006-031579 2/2006

* cited by examiner

*Primary Examiner* — Tuan Thai  
*Assistant Examiner* — Ngoc V Dinh  
(74) *Attorney, Agent, or Firm* — Brundidge & Stanger, P.C.

(57) ABSTRACT

This storage apparatus further includes a control unit for creating a second volume as a backup volume of the first volume upon receiving a backup command of the first volume from the host apparatus, and sending a completion reply of the backup command to the host apparatus while the formatting of the second volume and the replication from the first volume to the second volume are incomplete.

14 Claims, 27 Drawing Sheets

FIG.6

| | | | | | | | | | | | |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |

| | | | | | | | | | | | |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 0 | 0 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |

| LUN | OWNERSHIP |
|---|---|
| 0 | 0 |
| 1 | 1 |
| 2 | 0 |
| 3 | 1 |
| 4 | 0 |
| 5 | 1 |
| 6 | 0 |
| 7 | 1 |
| 8 | 0 |
| 9 | 1 |
| 10 | 0 |

| P-VOL | S-VOL | PAIR STATUS |
|---|---|---|
| 1 | 2 | REPLICATION STATUS |
| 3 | 4 | SPLIT STATUS |
| 5 | 6 | SPLIT STATUS (REPLICATING) |
| 7 | 8 | SPLIT STATUS |
| 9 | 10 | REPLICATION STATUS |

31A — 31B — 31C (31)

STORAGE APPARATUS AND CONTROL METHOD THEREOF

CROSS-REFERENCES

This application relates to and claims priority from Japanese Patent Application No. 2008-053729, filed on Mar. 4, 2008, the entire disclosure of which is incorporated herein by reference.

BACKGROUND

The present invention relates to a storage apparatus and its control method, and can be suitably applied to a storage apparatus that implements backup of a volume for storing data.

Conventionally, a storage apparatus that implements the backup of volumes for storing data in order to effectively prevent the loss of such data sent from a host apparatus is widely known, and various technologies relating to such storage apparatus have been proposed.

For example, Japanese Patent Laid-Open Publication No. 2006-031579 discloses technology for saving the trouble of issuing as plurality of commands from a processing apparatus upon creating a plurality of replications regarding data of the storage volume in the storage apparatus, and guaranteeing the data consistency of a plurality of related storage volumes. Specifically, Japanese Patent Laid-Open Publication No. 2006-031579 discloses a method of temporarily saving unreplicated data in a save area.

Meanwhile, in recent years, as an embodiment of backing up volumes, by coordinating with VSS (Volume Shadow Copy Service) as one function loaded in the server OS (Operation System) (host apparatus) of Microsoft Corporation (registered trademark), a backup environment can be provided at low cost and with minimal user burden.

In the coordination with this kind of VSS (host apparatus), since the time setting from the time the VSS sends a backup command until it receives a completion reply is short due to the specification of VSS, the backup processing in the storage apparatus was operated as follows in order to prevent errors caused by a timeout of the backup command.

Specifically, with this storage apparatus, the same volume is created in advance regarding all volumes, and the pair status is constantly maintained so that the data between the volumes will be the same. In addition, with this storage apparatus, when a backup command is received from VSS, the backup processing is operated by releasing the pair status of the corresponding volumes and separating the volumes.

Nevertheless, when the backup processing is operated as described above in this storage apparatus, since the pair status of all volumes including volumes that are not backed up is maintained, there are problems in that the user will be required to perform complex operations during initialization, and a storage area that is more than twice of the actually used storage area is required.

SUMMARY

The present invention was devised in view of the foregoing points. Thus, an object of the present invention is to propose a storage apparatus and its control method capable of improving its usability for a user.

In order to achieve the foregoing object, the present invention provides a storage apparatus including a first volume for storing data sent from a host apparatus and for performing backup of the first volume. This storage apparatus comprises a control unit for creating a second volume as a backup volume of the first volume upon receiving a backup command of the first volume from the host apparatus, and sending a completion reply of the backup command to the host apparatus while the formatting of the second volume and the replication from the first volume to the second volume are incomplete.

The present invention additionally provides a control method of a storage apparatus including a first volume for storing data sent from a host apparatus and for performing backup of the first volume. This storage apparatus control method comprises a first step of a control unit for creating a second volume as a backup volume of the first volume upon receiving a backup command of the first volume from the host apparatus, and a second step of a control unit sending a completion reply of the backup command to the host apparatus while the formatting of the second volume and the replication from the first volume to the second volume are incomplete.

Accordingly, since it is possible to create a backup volume on a case-by-case basis only for the volumes that received a split command without having to maintain the pair status regarding all volumes including volumes that are not backed up, it is possible to effectively prevent the user from performing complex operations upon initialization, and a storage area that is greater than the actually used storage area is no longer required.

According to the present invention, it is possible to realize a storage apparatus and its control method capable of improving its usability for a user.

DESCRIPTION OF DRAWINGS

FIG. 6 is a conceptual diagram explaining the configuration of a format management bitmap;

FIG. 7 is a conceptual diagram explaining the configuration of a replication management bitmap;

FIG. 8 is a conceptual diagram explaining the configuration of an ownership management table;

FIG. 9 is a conceptual diagram explaining the configuration of a pair management table;

DETAILED DESCRIPTION

An embodiment of the present invention is now explained with reference to the attached drawings. This invention, however, shall not be limited by this embodiment in any way.

Figure 1:
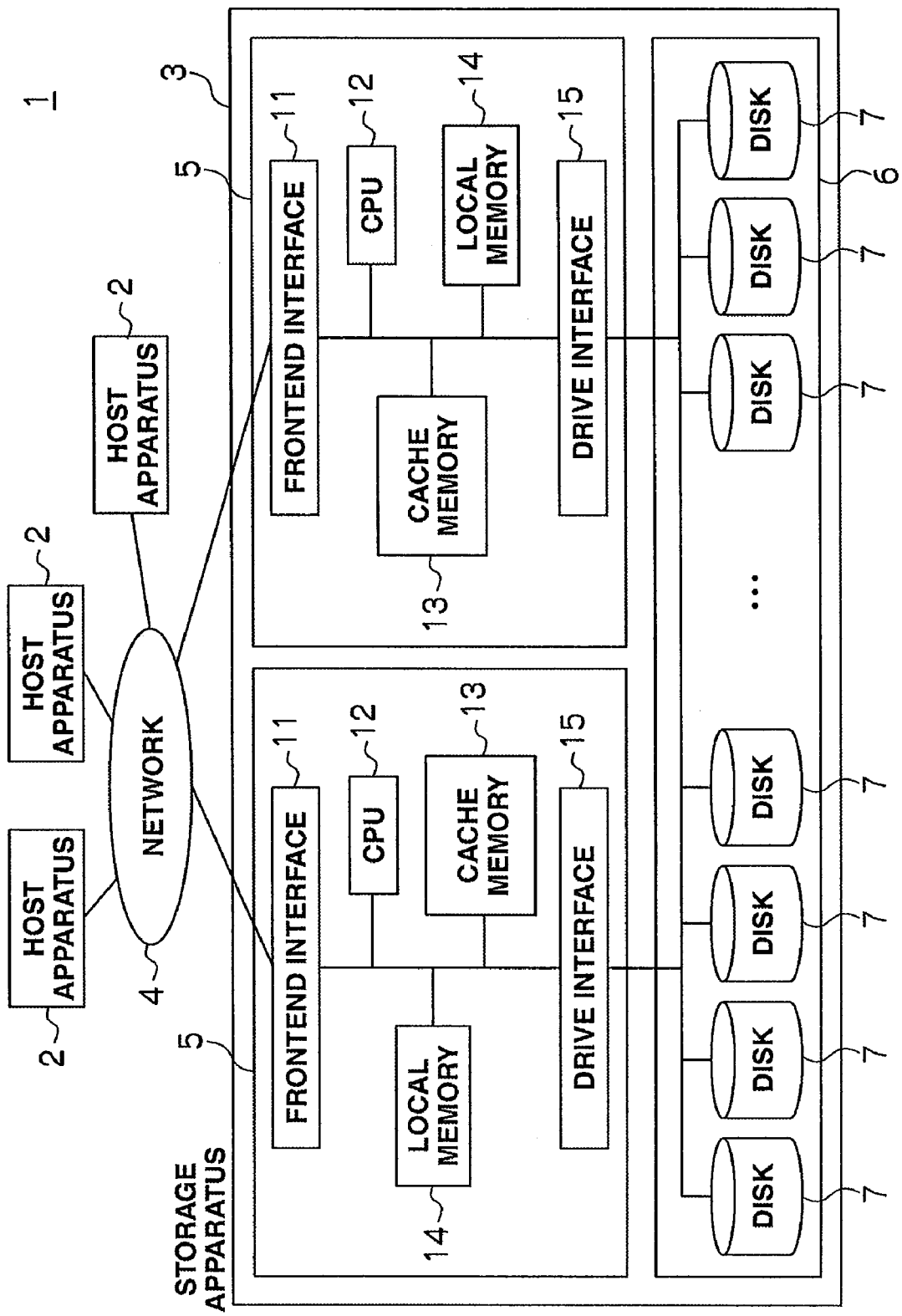
FIG. 1 is a block diagram showing the configuration of a storage system according to an embodiment of the present invention.

FIG. 1 shows an example of the configuration of a storage system 1 according to the present embodiment. The storage system 1 is configured by a host apparatus 2 and a storage apparatus 3 being connected via a network 4.

The host apparatus 2 is a computer device comprising information processing resources such as a CPU (Central Processing Unit) and a memory, and is configured from a personal computer, a workstation, a mainframe, or the like. The host apparatus 2 comprises an information input module (not shown) such as a keyboard, a switch, a pointing device, or a microphone, and an information output module (not shown) such as a monitor display or a speaker. The host apparatus 2 is provided with an application program such as database software that uses the storage area provided by the storage apparatus 3, a VSS program for implementing the backup of volumes (described later) of the storage apparatus 3, and an adapter (not shown) for accessing the storage apparatus 3 via the network 4.

The network 4 is configured from a LAN (Local Area Network), a SAN (Storage Area Network), Internet, a dedicated line, a public line or the like depending on the situation. Data communication via the LAN is performed according to iSCSI or TCP/IP (Transmission Control Protocol/Internet Protocol) protocol. If the host apparatus 2 is to be connected to the storage apparatus 3 via the LAN, a file name is designated and the data I/O is requested in file units. Meanwhile, if the host apparatus 2 is to be connected to the storage apparatus 3 via the SAN, the data I/O is requested in block units, which is a data management unit of the storage area provided by a plurality of disk storage apparatuses (disk devices 7 (described later)) according to the fibre channel protocol. The adapter of the host apparatus 2 is a LAN-compatible network card if the network 4 is a LAN. Meanwhile, the adapter of the host apparatus 2 is a host bus adapter if the network 4 is a SAN.

The storage apparatus 3 is configured, for instance, as a disk array system. Here, the storage apparatus 3 is configured from a controller unit 5 and a memory unit 6. The storage apparatus 3 needs to comprise at least one controller unit 5. In this embodiment, two controller units 5 are provided to improve reliability. The controller unit 5 controls the overall the storage apparatus 3. The memory unit 6 is configured from the disk device 7 storing data sent from the host apparatus 2.

The controller unit 5 is configured from a frontend interface 11, a CPU 12, a cache memory 13, a local memory 14 and a drive interface 15.

The frontend interface 11 is connected to the host apparatus 2 via the network 4, and controls the sending and receiving of various commands and data sent from the host apparatus 2. Various types of interfaces can be used as the frontend interface 11 according to the type of network 4.

One CPU 12 is provided for each controller unit 5. The CPU 12 controls the overall controller unit 5, and interprets the commands sent from the frontend interface 11 and sends commands to the respective constituent components. The CPU 12 is able to improve the reliability, availability and performance of the storage apparatus 3 by performing RAID (Redundant Arrays of Independent Disks) control to the disk device 7.

Here, the CPU 12 operates the disk device 7 in RAID format. The CPU 12 sets one or more logical volumes (hereinafter referred to as the "volumes") in a physical storage area (RAID group) provided by one or more disk devices 7. The data is stored in block (hereinafter referred to as "logical block") units of a prescribed size in the volumes.

A unique identifier (hereinafter referred to as an "LUN" (Logical Unit Number)) is assigned to each volume. In the case of this embodiment, the I/O of data is conducted by setting the combination of the LUN and a number (LBA: Logical Block Address) that is unique to the logical block assigned to each logical block as the address, and designating the address.

The cache memory 13 temporarily stores data received from the host apparatus 2, and stores various tables to be used in the storage apparatus 3. Here, a part of the cache memory 13 is used as a shared memory with the other controller units 5, and when one controller unit 5 is blocked (malfunctions), information is taken over by another normal controller unit 5.

Figure 2:
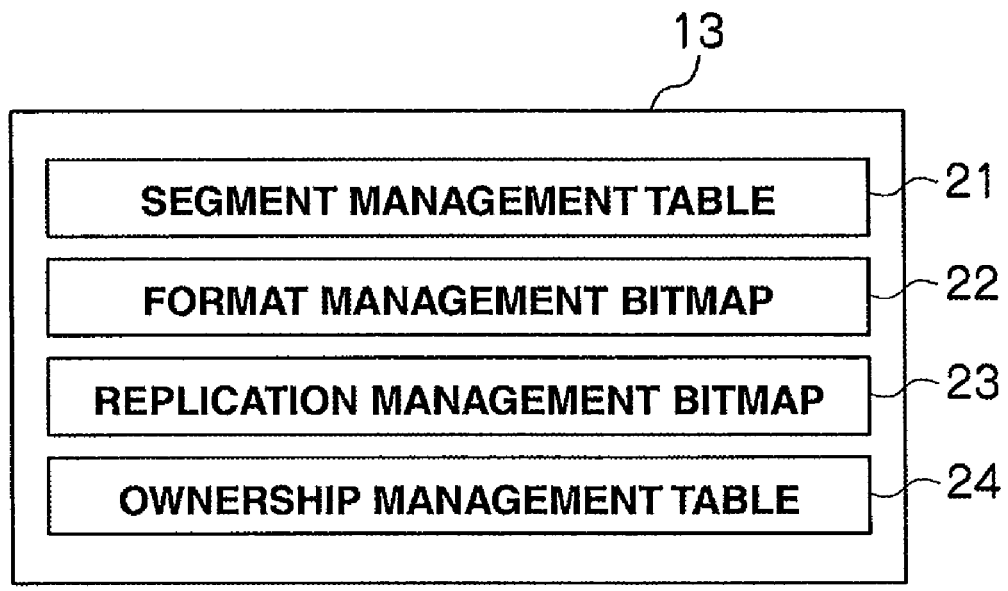
FIG. 2 is a conceptual diagram explaining the various tables stored in a cache memory.

FIG. 2 shows an example of the various tables stored in the cache memory 13. The cache memory 13 stores a segment management table 21, a format management bitmap 22, a replication management bitmap 23, and an ownership management table 24. The specific configuration of the segment management table 21, the format management bitmap 22, the replication management bitmap 23 and the ownership management table 24 will be described later.

The local memory 14 stores various programs and various tables to be used in the controller unit 5.

Figure 3:
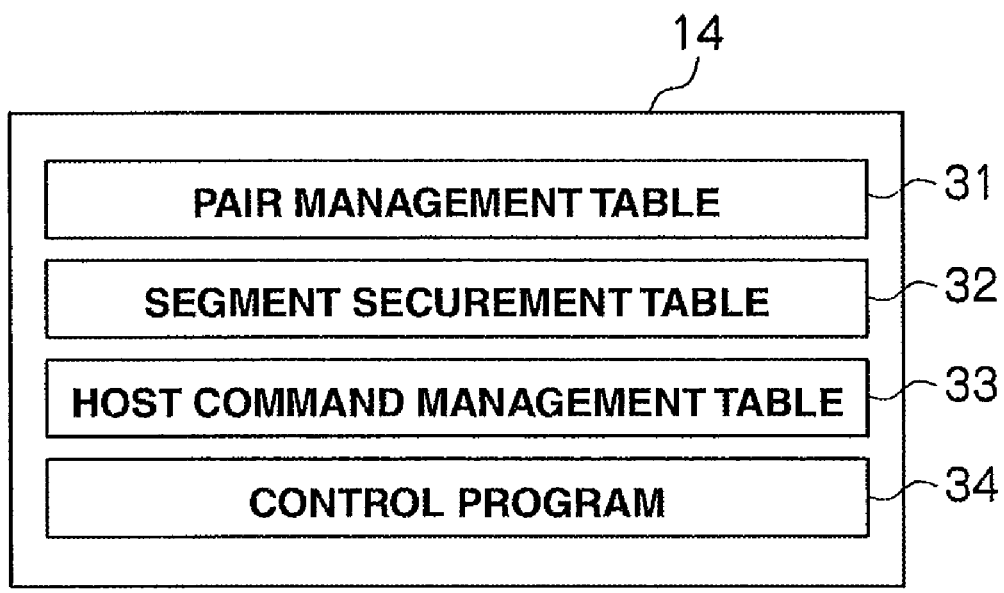
FIG. 3 is a conceptual diagram explaining the various programs and various tables stored in a local memory.

FIG. 3 shows an example of the various programs and various tables stored in the local memory 14. The local memory 14 stores a pair management table 31, a segment management table 32, a host command management table 33, and a control program 34. The specific configuration of the pair management table 31, the segment securement table 32 and the host command management table 33 as well as the specific processing of the control program 34 will be described later.

The drive interface 15 is connected to the disk device 7 of the memory unit 6, and controls the sending and receiving of data sent from the host apparatus 2. As the drive interface 15, various interfaces may be used according to the type of a fibre channel, a SAS (Serial Attached SCSI), a SATA (Serial ATA) or the like.

Figure 4:
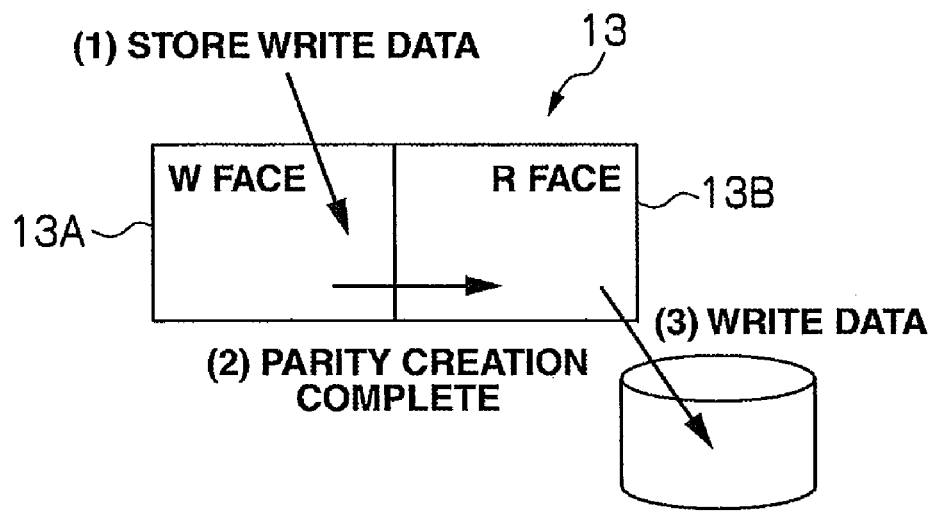
FIG. 4 is a conceptual diagram explaining the scheme of a storage apparatus receiving write data and storing it in a disk device.

FIG. 4 shows a scheme of the storage apparatus 3 receiving write data and storing it in the disk device 7. When the CPU 12 receives a write command from the host apparatus 2, it stores the write data sent from the host apparatus 2 in a write face 13A of the cache memory 13 (FIG. 4 (1)). Subsequently, the CPU 12 creates parity data of the write data when triggered to store the write data in the disk device 7, and stores the write data and the parity data in the read face 13B of the cache memory 13 (FIG. 4 (2)). The CPU 12 also deletes the write data from the write face 13A of the cache memory 13. The CPU 12 thereafter stores the write data and the parity data in the corresponding disk device 7 at a prescribed timing (FIG. 4 (3)).

Figure 5:
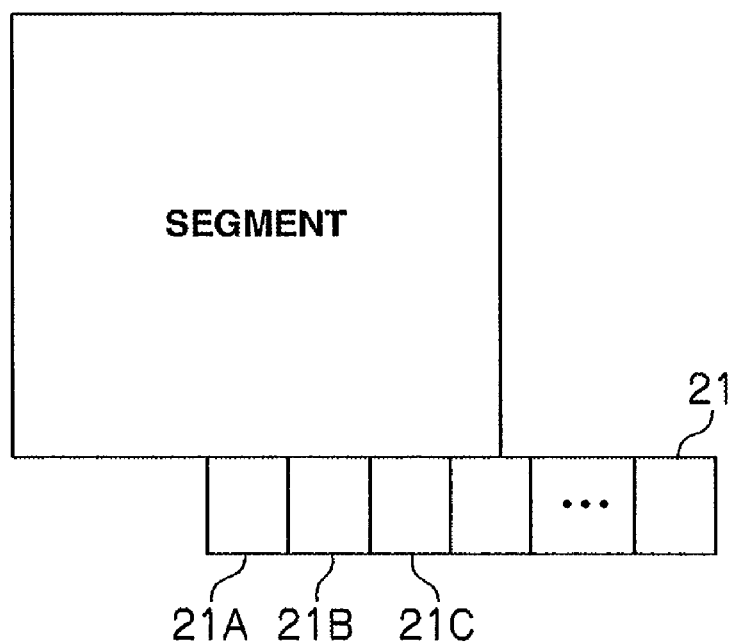
FIG. 5 is a conceptual diagram explaining the configuration of a segment management table.

FIG. 5 shows an example of the configuration of the segment management table 21. The segment management table 21 exists in segment units, which is the smallest unit of data managed in the cache memory 13, and manages the status and attribute of the segment. The segment management table 21 is configured from a write face column 21A, a read face column 21B, a write inhibition column 21C, and other columns.

The write face column 21A manages whether a segment is stored in the write face 13A of the cache memory 13. For example, "1" is stored in the write face column 21A if a segment is stored in the write face 13A of the cache memory 13, and "0" is stored in the write face column 21A if a segment is not stored in the write face 13A of the cache memory 13.

The read face column 21B manages whether a segment is stored in the read face 13B of the cache memory 13. For example, "1" is stored in the read face column 21B if a segment is stored in the read face 13B of the cache memory 13, and "0" is stored in the read face column 21B if a segment is not stored in the read face 13B of the cache memory 13.

The write inhibition column 21C manages whether to prohibit the storage of a segment in the disk device 7. For example, "1" is stored in the write inhibition column 21C if the storage of a segment in the disk device 7 is to be prohibited, and "0" is stored in the write inhibition column 21C is the storage of a segment in the disk device 7 is to be permitted. In other words, the CPU 12 does not store the corresponding segment in the disk device 7 when "1" is stored in the write inhibition column 21C.

If a segment is stored in the write face 13A of the cache memory 13, since the write data (segment) cannot be stored in the disk device 7, "1" is stored in the write face column 21A and "1" is stored in the write inhibition column 21C in the segment management table 21.

In addition, if a segment is moved to the read face 13B of the cache memory 13, the write face column 21A is changed to "0," the read face column 21B is changed to "1" and the write inhibition column 21C is changed to "0" in the segment management table 21.

FIG. 6 shows an example of the configuration of the format management bitmap 22. The format management bitmap 22 manages, for each segment, whether the formatting of a backup destination volume (hereinafter referred to as the "secondary volume 42" (S-VOL) (FIG. 17, etc.)) is complete when implementing backup. For example, in the format management bitmap 22, "0" is stored in the corresponding bitmap if the formatting of the volume segment of the secondary volume 42 is complete, and "1" is stored in the corresponding bitmap if the formatting of the volume segment of the secondary volume 42 is incomplete.

FIG. 7 shows an example of the configuration of the replication management bitmap 23. The replication management bitmap 22 manages, for each segment, whether the replication from a backup target volume (hereinafter referred to as a "primary volume 41" (P-VOL) (FIG. 17, etc.)) to the secondary volume 42 is complete upon implementing backup. For example, in the replication management bitmap 22, "0" is stored in the corresponding bitmap if the replication from the primary volume 41 to the secondary volume 42 is complete, and "1" is stored in the corresponding bitmap if the replication from the primary volume 41 to the secondary volume 42 is incomplete.

FIG. 8 shows an example of the configuration of the ownership management table 24. The ownership management table 24 manages which controller unit 5 possesses the ownership of the volume (authority to manage the volume) for each volume. The ownership management table 24 is configured from a LUN column 24A and an ownership column 24B.

The LUN column 24A manages the LUN number for uniquely identifying the LUN of the volume. The ownership column 24B manages the ownership number for uniquely identifying the controller unit 5 possessing the ownership. For example, a volume having the LUN number of "0" is being managed by the controller unit 5 having the controller number of "0."

FIG. 9 shows an example of the configuration of the pair management table 31. The pair management table 31 manages the pair status of the primary volume 41 and the secondary volume 42. The pair management table 31 is managed for each controller unit 5, and, if a failure or the like occurs in the controller unit 5, the pair status is replicated to the pair management table 31 of the other controller unit 5 so that the processing can be continued. The pair management table 31 is configured from a P-VOL column 31A, an S-VOL column 31B, and a pair status column 31C.

The P-VOL column 31A manages the P-VOL number for uniquely identifying the primary volume 41. The S-VOL column 31B manages the S-VOL number for uniquely identifying the secondary volume 42. The pair status column 31C manages the pair status of the primary volume 41 and the secondary volume 42. For example, "replication status" is stored in the pair status column 31C if data is being replicated from the primary volume 41 to the secondary volume 42. Further, "split status" is stored in the pair status column 31C if the primary volume 41 and the secondary volume 42 are split. Moreover, "split status (replicating)" is stored in the pair status column 31C is the primary volume 41 and the secondary volume 42 are split but replication (described later) is being performed in the background.

Figure 10:
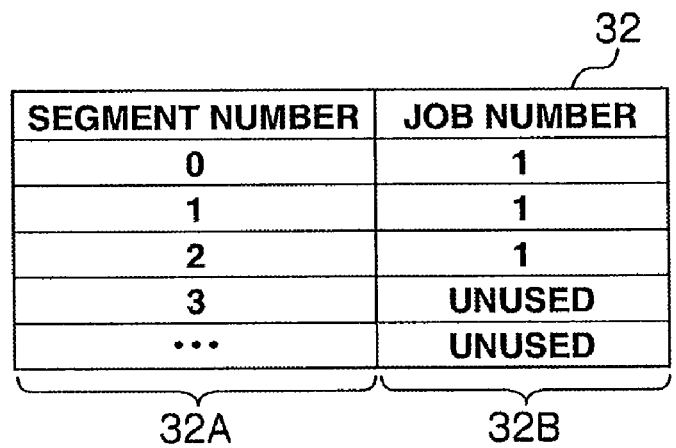
FIG. 10 is a conceptual diagram explaining the configuration of a segment securement table.

FIG. 10 shows an example of the configuration of the segment securement table 32. The segment securement table 32 manages, for each segment, by which job the data segment is being executed (secured). The segment securement table 32 is configured from a segment number column 32A and a job number column 32B. The segment number column 32A manages the segment number for uniquely identifying the data segment. The job number column 32B manages the job number for uniquely identifying the job that is executing (securing) the data segment. For example, a segment having the segment number of "0" is being executed by a job having the job number of "1." Incidentally, "Unused" is stored in the job number column 32B if a job is not being executed to the segment.

Figure 11:
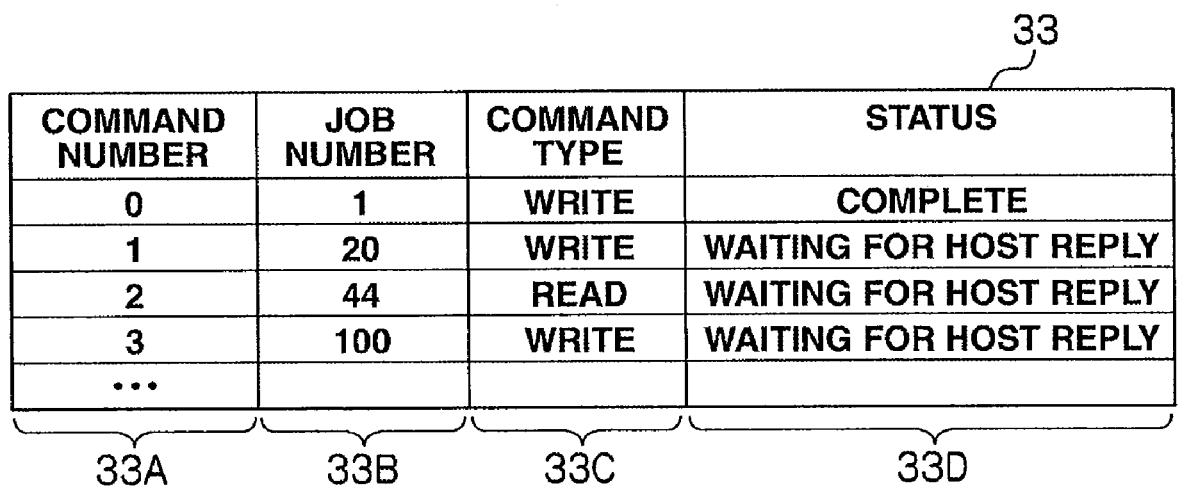
FIG. 11 is a conceptual diagram explaining the configuration of a host command management table.

FIG. 11 shows an example of the configuration of the host command management table 33. The host command management table 33 manages, for each command, a status showing whether the job regarding a command sent from the host apparatus 2 is complete and a reply has been sent to the host apparatus 2. The host command management table 33 is configured from a command number column 33A, a job number column 33B, a command type column 33C, and a status column 33D.

The command number column 33A manages the command number for uniquely identifying the command sent from the host apparatus 2. The job number column 32B manages the job number for uniquely identifying the command job. The command type column 33C manages the command type of the command. For example, "Write" is stored in the command type column 33C if the command is a write command job, and "Read" is stored in the command type column 33C if the command is a read command job. The status column 33D manages whether the job concerning the command is complete and a reply has been sent to the host apparatus 2. For example, "Complete" is stored in the status column 33D if the job is complete and a reply has been issued to the host apparatus 2, and "Host Reply Waiting" is stored in the status column 33D if the job is being executed.

Figure 12:
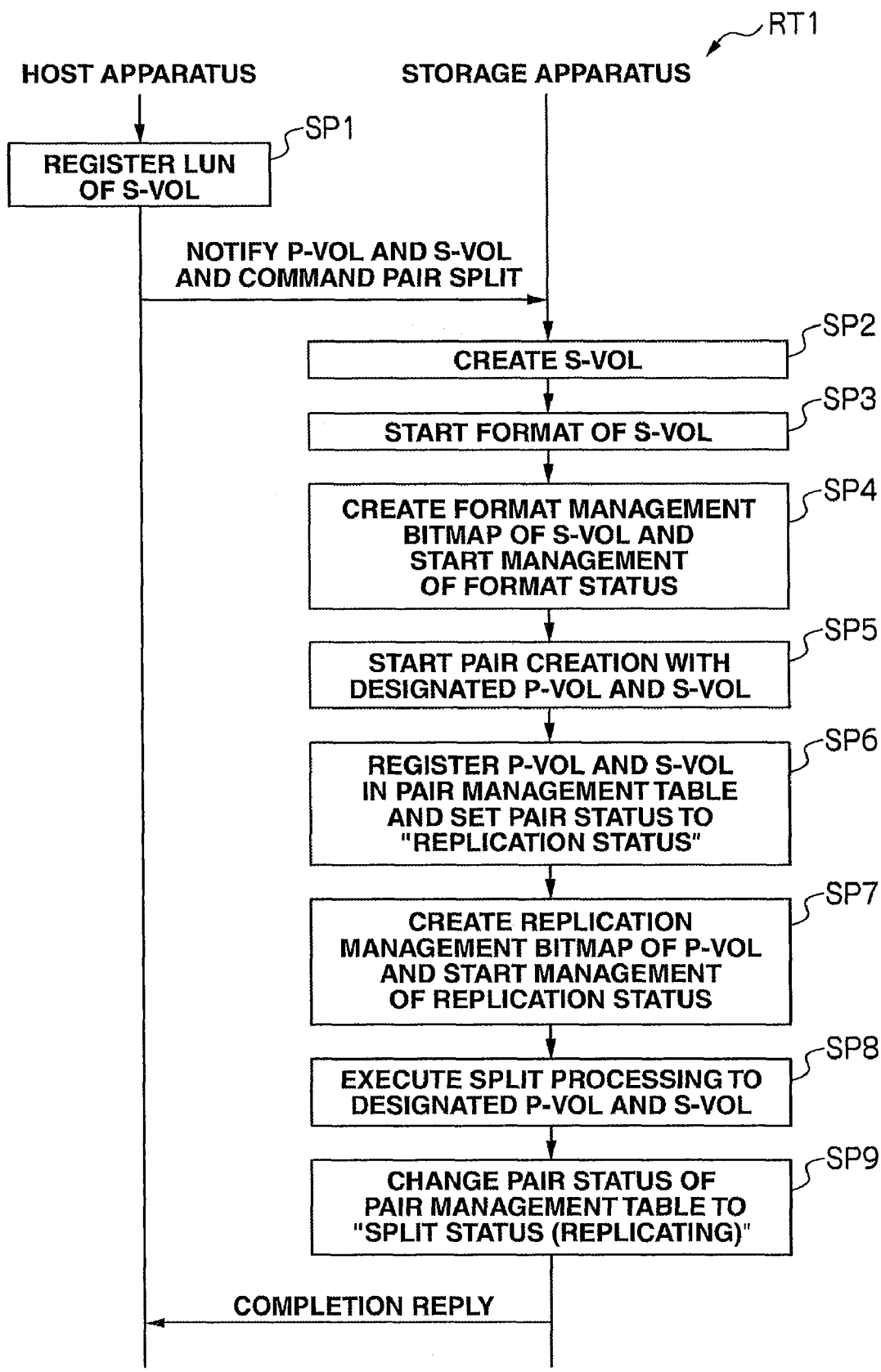
FIG. 12 is a flowchart showing a backup processing routine.

FIG. 12 is an example of a sequence chart showing the specific processing routine of the host apparatus 2 and the storage apparatus 3 concerning the backup processing in the storage system 1.

When the host apparatus 2 receives a registration command of the LUN of the secondary volume 42 based on the user's operation of an operation console (not shown) of the host apparatus 2, it executes the VSS program and, according to the backup processing routine RT1 shown in FIG. 12, registers the LUN of the secondary volume 42 designated by the user (SP1), and send a registration completion reply to the user by displaying a message or the like on a display unit (not shown) of the host apparatus 2.

Subsequently, if the host apparatus 2 receives a creation command of a backup volume (secondary volume 42) designating the primary volume 41 based on the user's operation of an operation console (not shown) of the host apparatus 2, it notifies the designated primary volume 41 and the secondary volume 42 to the storage apparatus 3, and sends a split command of the pair of the primary volume 41 and the secondary volume 42 to the storage apparatus 3 (SP2).

Subsequently, if the storage apparatus 3 receives a notice and a split command from the host apparatus 2, it executes the control program 34 and creates a secondary volume 42 corresponding to the designated primary volume 41 based on the notice and the split command (SP3). The storage apparatus 3 thereafter creates the format management bitmap 22 of the secondary volume 42, and starts the management of the format status of the secondary volume 42 (SP4).

Subsequently, the storage apparatus 3 starts the pair creation of the notified primary volume 41 and the secondary volume 42 (SP5). The storage apparatus 3 thereafter registers the primary volume 41 and the secondary volume 42 in the pair management table 31, and sets the pair status to "replication status" (SP6).

Subsequently, the storage apparatus 3 creates the replication management bitmap 23 of the primary volume 41, and starts the management of the replication status of the primary volume 41 (SP7). The storage apparatus 3 thereafter executes the split processing to the notified primary volume 41 and the secondary volume 42 (SP8).

Subsequently, the storage apparatus 3 changes the pair status of the primary volume 41 and the secondary volume 42 registered in the pair management table 31 to "split status (replicating)" (SP9). The storage apparatus 3 thereafter sends a split command completion reply to the host apparatus 2.

When the host apparatus 2 eventually receives a split command completion reply from the storage apparatus 3, it notifies the creation command completion reply of the secondary volume 42 to the user, and thereafter ends the backup processing routine RT1 shown in FIG. 12.

Here, with the storage system 1, although the writing of data from the host apparatus 2 is enabled from the time that the formatting of the secondary volume 42 is started, the writing of data up to the execution of split processing of the storage apparatus 3 is inhibited. In other words, with the storage system 1, the writing of data is disabled before the formatting of the secondary volume 42 since it has not yet been formatted. When the storage system 1 executes the split processing of the storage apparatus 3, the inhibition of data writing is released, and the writing of data from the host apparatus 2 to the secondary volume 42 is enabled. The inhibition of data writing is different from the write inhibition flag stored in the write inhibition column 21C of the segment management table 21.

Figure 13:
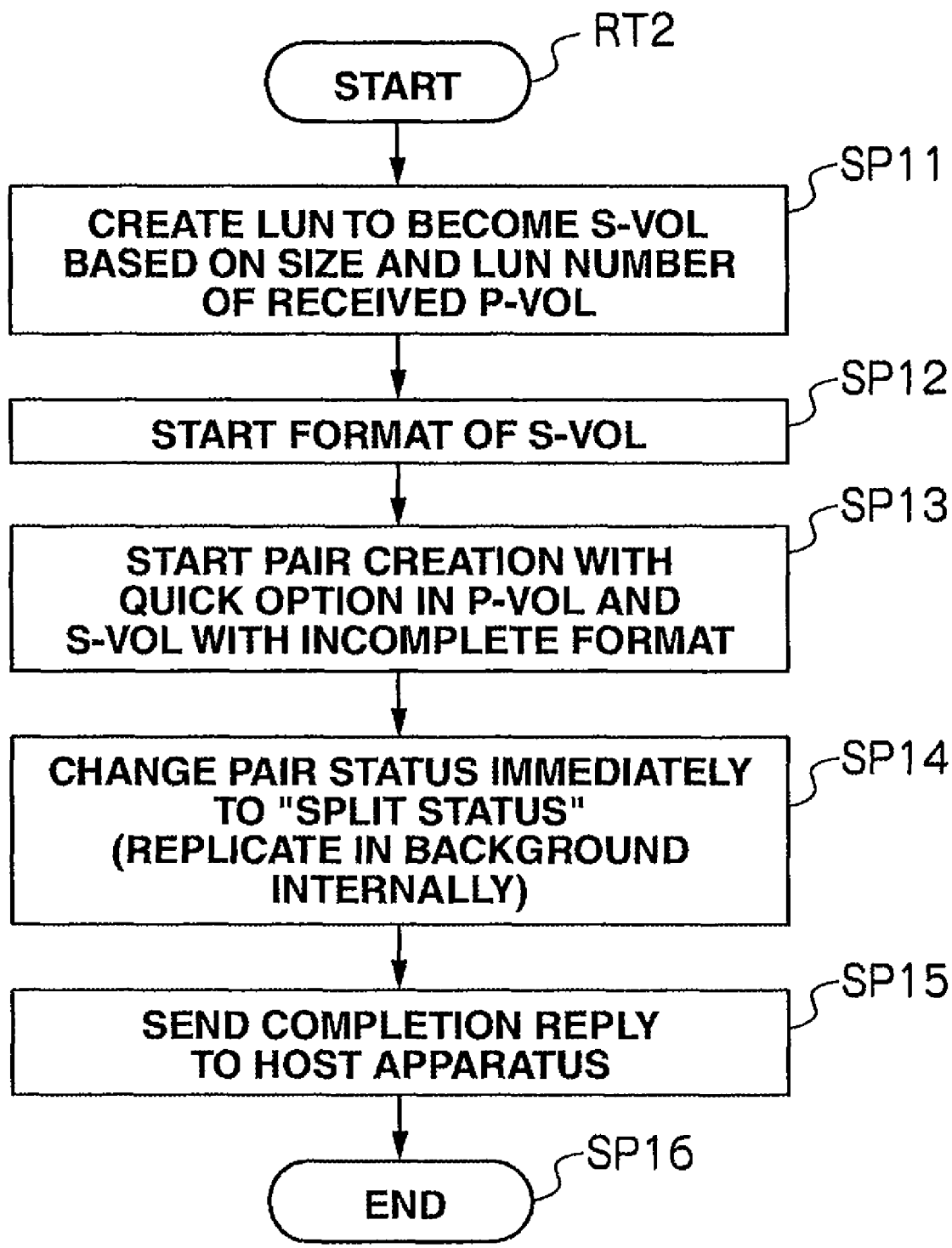
FIG. 13 is a flowchart showing a backup processing routine.

FIG. 13 is an example of a flowchart showing the specific processing routine of the CPU 12 of the storage apparatus 3 concerning the backup processing of the storage apparatus 3 in the storage system 1.

This flowchart explains the routine for creating a snapshot to be used for backup in the storage apparatus 3 when the host apparatus 2 executes the VSS program and issues a backup command.

With a conventional backup method, since data was directly replicated from a volume that is being used to a backup destination volume of a tape device or the like, it is not possible to back up files that are being used or files that are locked. Moreover, with a conventional backup method, since much time is required for the data replication of backup, there is a problem in that the consistency cannot be maintained in the volumes since the timing of data replication is different.

With the backup method where the host apparatus 2 executes the VSS program and issues a backup command, data is not directly replicated from the volume to be backed up, and data (snapshot) at a certain point in time is acquired, and such snapshot is replicated in the backup destination volume of a tape device or the like. The host apparatus 2 coordinates with the VSS program and OS to temporarily stop the I/O command and confirm the data to be backed up upon acquiring the snapshot.

With the VSS program, the time of temporarily stopping the I/O command is set to be within 30 seconds. In other words, with the storage apparatus 3, it is necessary to complete the processing from the host apparatus 2 sending a split command to receiving the split command completion reply in less than 30 seconds. Thus, with this backup method, a secondary volume 42 having the same size as the primary volume 41 is created in advance and notified to the host apparatus 2, the storage apparatus 3 constantly maintained the pair status of the primary volume 41 and the secondary volume 42, and completed the backup processing in less than 30 seconds by performing split processing each time a split command was issued.

Nevertheless, with this backup method, a storage capacity that is twice the size is required since a volume having the same size as the volume to be backed up is prepared, and the user needs to perform complicated operations such as creating a backup volume in advance, formatting the volume, and creating pair volumes.

With the storage system 1 of this embodiment, when a split command is issued from the host apparatus 2, the creation, formatting, pair creation and split of the secondary volume 42 are performed. In other words, with the storage system 1, a LUN number that is available upon acquiring backup is notified to the host apparatus 2 in advance. Subsequently, with the storage system 1, when the host apparatus 2 is to execute the VSS program and perform backup, a split command of the primary volume is sent to the storage apparatus 3. Here, the host apparatus 2 simultaneously notifies the LUN number and the like of the primary volume 41 to the storage apparatus 3.

Subsequently, with the storage system 1, the storage apparatus 3 acquires the size of the primary volume 41 of the notified LUN number, and creates and formats the secondary volume 42. Here, with the storage system 1, the formatting is performed in the background, and the pair creation of the primary volume 41 and the secondary volume 42 is implemented while the formatting is being performed.

Here, although data replication from the primary volume 41 to the secondary volume 42 is normally performed and the pair creation is complete at the point in time the data coincide, with the storage system 1 of this embodiment, replication is performed in the background by assuming that the pair creation has been completed during data replication.

With the storage system 1, as a result of sending a completion reply to the split command from the host apparatus 2 at this point in time, the host apparatus 2 instantaneously determines that the backup processing is complete. This is now explained with reference to the flowchart.

When the CPU 12 receives the foregoing notice and split command from the host apparatus 2, it executes the control program 34 and, according to the backup processing routine RT2 shown in FIG. 13, creates a volume (LU) to become the secondary volume 42 based on the size and LUN number of the designated primary volume 41 (SP11). Incidentally, a split command is a creation command of the secondary volume 42. The LUN number of the primary volume 41 notified from the host apparatus 2 is not managed by the storage apparatus 3, and is managed in the host apparatus 2.

Subsequently, the CPU 12 starts the formatting of the secondary volume 42 (SP12). In other words, when a split command is issued, the CPU 12 creates a format management bitmap 22 in the cache memory 13, sets all bits to "ON (1)," and, when the format is complete, changes the corresponding bits to "OFF (0)." Since the CPU 12 performs the formatting of the secondary volume 42 in the background, it proceeds to the subsequent step while the formatting of the secondary volume 42 is incomplete.

Subsequently, the CPU 12 starts the pair creation of the notified primary volume 41 and the secondary volume 42 while the formatting of the secondary volume 42 is incomplete (SP13). Here, the CPU 12 registers the primary volume 41 and the secondary volume 42 in the pair management table 31, and sets the pair status to "replication status."

Subsequently, the CPU 12 immediately changes the pair status to "split status" (SP14). Here, the CPU 12 changes the pair status of the primary volume 41 and the secondary volume 42 registered in the pair management table 31 to a "split status (replicating)," changes the pair status from a "replication status" to a "split status," and implements the replication processing of data from the primary volume 41 to the secondary volume 42 in the background in the storage apparatus 3.

In this case, the CPU 12 creates a replication management bitmap 23 in the cache memory 13 upon starting the replication processing, sets all bits to "ON (1)," and, when the replication is complete, changes the corresponding bits to "OFF (0)." Since the CPU 12 implements the replication of data from the primary volume 41 to the secondary volume 42 in the background, it proceeds to the subsequent step while the replication of data from the primary volume 41 to the secondary volume 42 is incomplete. When the replication processing of data in the background is complete, the CPU 12 changes the pairs status of the primary volume 41 and the secondary volume 42 stored in the pair management table 31 to a "split status."

When the CPU 12 replicates data in the secondary volume 42, it refers to the corresponding bits of the format management bitmap 22 before referring to the replication management bitmap 23 and, if the bits are unformatted (bits are still "ON"), formats the corresponding bits first. When the formatting is complete, the CPU 12 refers to the replication management bitmap 23 and replicates data to the corresponding location of the secondary volume 42.

Subsequently, the CPU 12 sends a split command completion reply to the host apparatus 2 while the formatting of the secondary volume 42 and the replication of data from the primary volume 41 to the secondary volume 42 are incomplete (SP15).

Eventually, the CPU 12 thereafter ends the backup processing routine RT2 shown in FIG. 13 (SP16).

Figure 14:
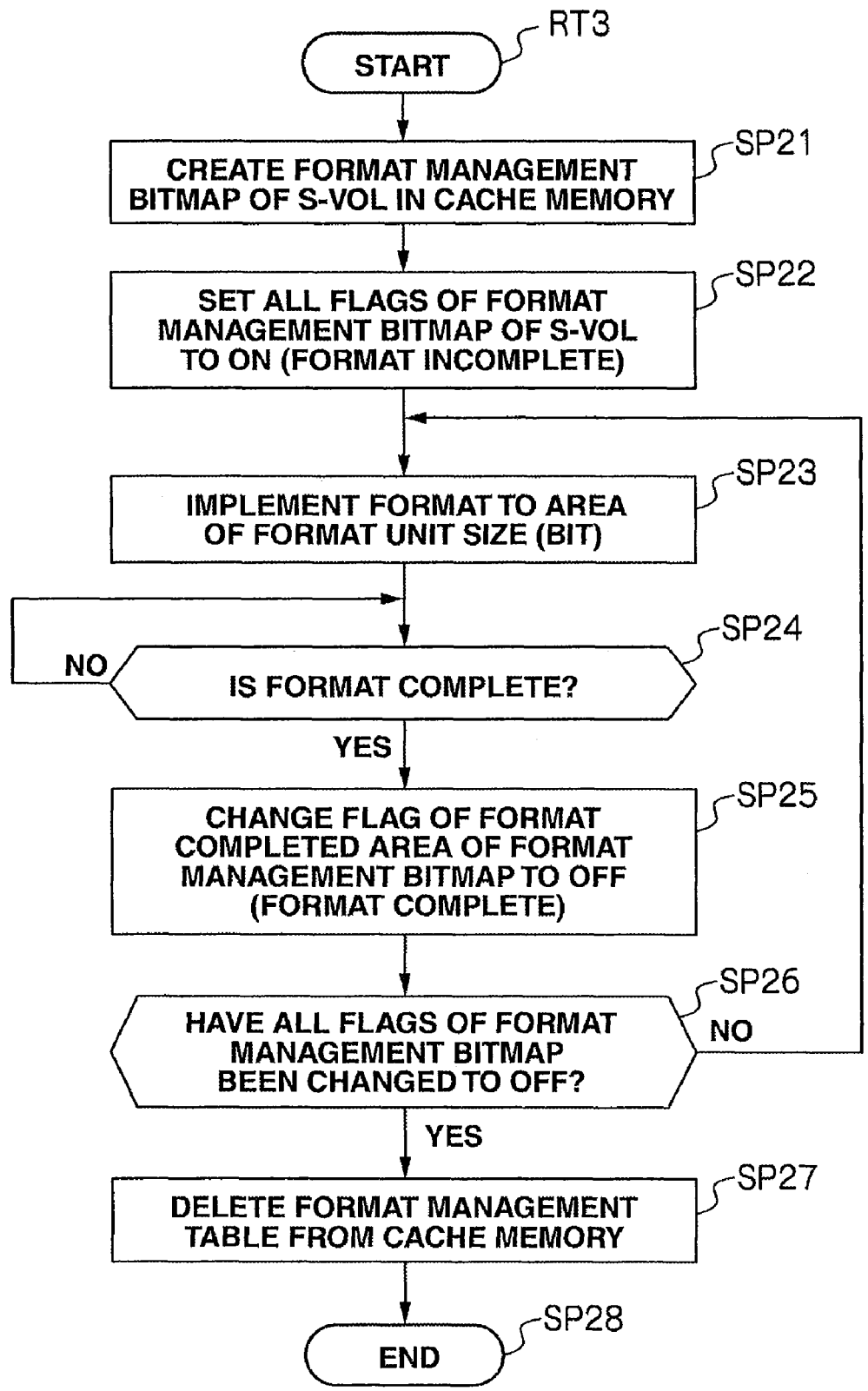
FIG. 14 is a flowchart showing the format processing of a secondary volume.

FIG. 14 is an example of a flowchart showing the specific processing routine of the CPU 12 of the storage apparatus 3 concerning the format processing of the secondary volume 42 of the storage apparatus 3 in the storage system 1.

When the CPU 12 creates a volume to become the secondary volume 42 (SP11), it executes the control program 34 and, according to the format processing routine RT3 of the secondary volume 42 shown in FIG. 14, creates a format management bitmap 22 of the secondary volume 42 in the cache memory 13 (SP21).

Subsequently, the CPU 12 sets all flags (bits) of the format management bitmap 22 of the secondary volume 42 to "ON (1)" (format incomplete) (SP22). The CPU 12 thereafter implements the formatting of the area of the format management size (bit) (SP23).

Subsequently, the CPU 12 waits for the formatting of the area to become completed in standby mode (SP24). When the formatting of the area is eventually complete, the CPU 12 changes the flags of the area in which the formatting of the format management bitmap 22 has ended to "OFF (0)" (format complete) (SP26).

Subsequently, the CPU 12 checks whether all flags of the format management bitmap 22 have been changed to "OFF (0)" (SP26). If all flags of the format management bitmap 22 have not been changed to "OFF (0)" (SP26: NO), the CPU 12 returns to step SP23, formats the area of the unformatted format management size (SP23), and thereafter repeats the same processing as the processing described above (SP23 to SP26). Meanwhile, if all flags of the format management bitmap 22 have been changed to "OFF (0)" (SP26: YES), the CPU 12 deletes the format management bitmap 22 from the cache memory 13 since the formatting of the secondary volume 42 is complete (SP27).

Eventually, the CPU 12 thereafter ends the format processing routine RT3 of the secondary volume 42 shown in FIG. 14 (SP28).

If data is to be replicated from the primary volume 41 to an unformatted area among the areas of the secondary volume 42, the CPU 12 checks to make sure that data is not written into an unformatted area of the disk device 7. If the area is unformatted, the CPU 12 creates format data for formatting the area in the cache memory 13, and writes the format data in the disk device 7. The CPU 12 thereafter writes the corresponding data from the primary volume 41 in the cache memory 13 to the disk device 7 of the secondary volume 42.

Figure 15:
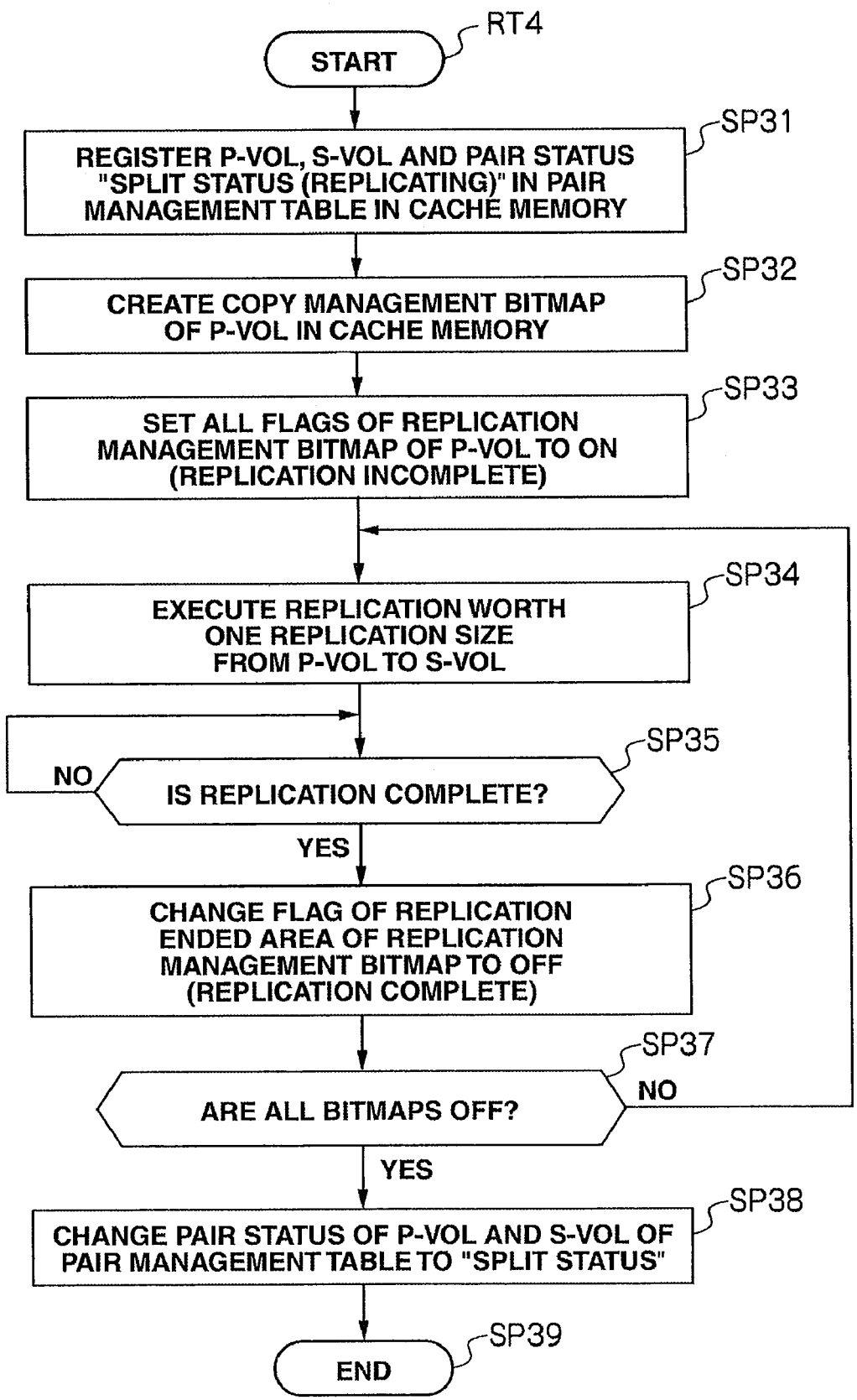
FIG. 15 is a flowchart showing a data replication processing routine of replicating data from a primary volume to a secondary volume.

FIG. 15 is an example of a flowchart showing the specific processing routine of the CPU 12 of the storage apparatus 3 concerning the data replication processing from the primary volume 41 to the secondary volume 42 of the storage apparatus 3 in the storage system 1.

When the CPU 12 starts the pair creation of the primary volume 41 and the secondary volume 42 (SP13), it executes the control program 34 and, according to the data replication processing routine RT4 from the primary volume 41 to the secondary volume 42 shown in FIG. 15, changes the pair status of the corresponding primary volume 41 and secondary volume 42 of the pair management table 31 in the cache memory 13 from a "replication status" to a "split status (replicating)" (SP31). Here, the pair management table 31 exists for each controller unit 5, and registers the primary volume 41 and the secondary volume 42 upon performing pair creation.

Subsequently, the CPU 12 creates a replication management bitmap 23 of the primary volume 41 in the cache memory 13 (SP32). Here, the CPU 12 creates the replication management bitmap 23 according to the size of the primary volume 41. The CPU 12 allocates 1-bit worth of the replication management bitmap 23 to a single replication size unit. The CPU 12 thereafter sets all flags (bits) of the replication management bitmap 23 of the primary volume 41 to "ON (1)" (replication incomplete) (SP33).

Subsequently, the CPU 12 implements the replication of data of a single replication size from the primary volume 41 to the secondary volume 42 (SP34). The CPU 12 thereafter waits for the replication of data of a single replication size to become complete in standby mode (SP35). When the replication of data of a single replication size is eventually complete, the CPU 12 changes the flags of the area in which the replication of the replication management bitmap 23 has ended to "OFF (0)" (replication complete) (SP36).

Subsequently, the CPU 12 checks whether all flags of the replication management bitmap 23 have been changed to "OFF (0)" (SP37). If all flags of the replication management bitmap 23 have not been changed to "OFF (0)" (SP37: NO), the CPU 12 returns to step SP34, replicates data of a single replication size of the area of the non-replicated format management size (SP34), and thereafter repeats the same processing as the processing described above (SP34 to SP37). Meanwhile, if all flags of the replication management bitmap 23 have been changed to "OFF (0)" (SP37: YES), the CPU 12 changes the pair status of the corresponding primary volume 41 and secondary volume 42 of the pair management table 31 from "split status (replicating)" to "split status" since the data replication from the primary volume 41 to the secondary volume 42 is complete (SP38).

Eventually, the CPU 12 thereafter ends the data replication processing routine RT4 from the primary volume 41 to the secondary volume 42 shown in FIG. 15 (SP39).

The data replication processing from the primary volume 41 to the secondary volume 42 is basically the same in the conventional processing and in the processing of this embodiment. Nevertheless, in the case of conventional processing, the CPU 12 notifies the host apparatus 2 of the data replication from the primary volume 41 to the secondary volume 42. Thus, if data is written from the host apparatus 2 into the primary volume 41 during the replication, the CPU 12 writes data into the secondary volume 42 up reflecting the written data.

Nevertheless, in the case of the processing of this embodiment, the CPU 12 sends a completion reply of the data replication from the primary volume 41 to the secondary volume 42 to the host apparatus 2. Thus, if data is written into the primary volume 41, if the data has not been replicated in the secondary volume 42 replication, the writing of data into the primary volume 41 is inhibited and data (old data) is replicated in the secondary volume 42.

Figure 16:
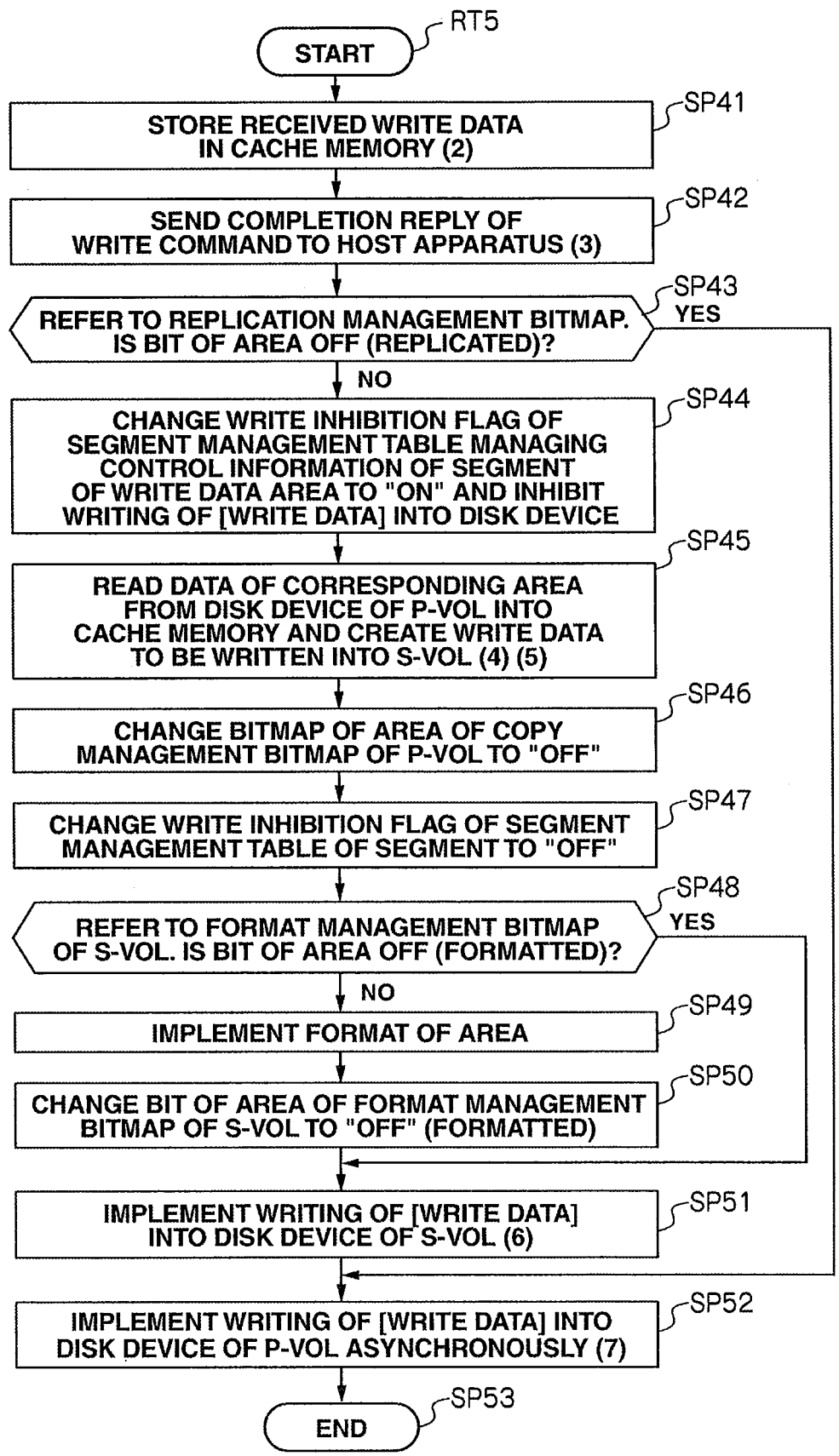
FIG. 16 is a flowchart showing a write processing routine to a primary volume after replying to a split command.
Figure 17:
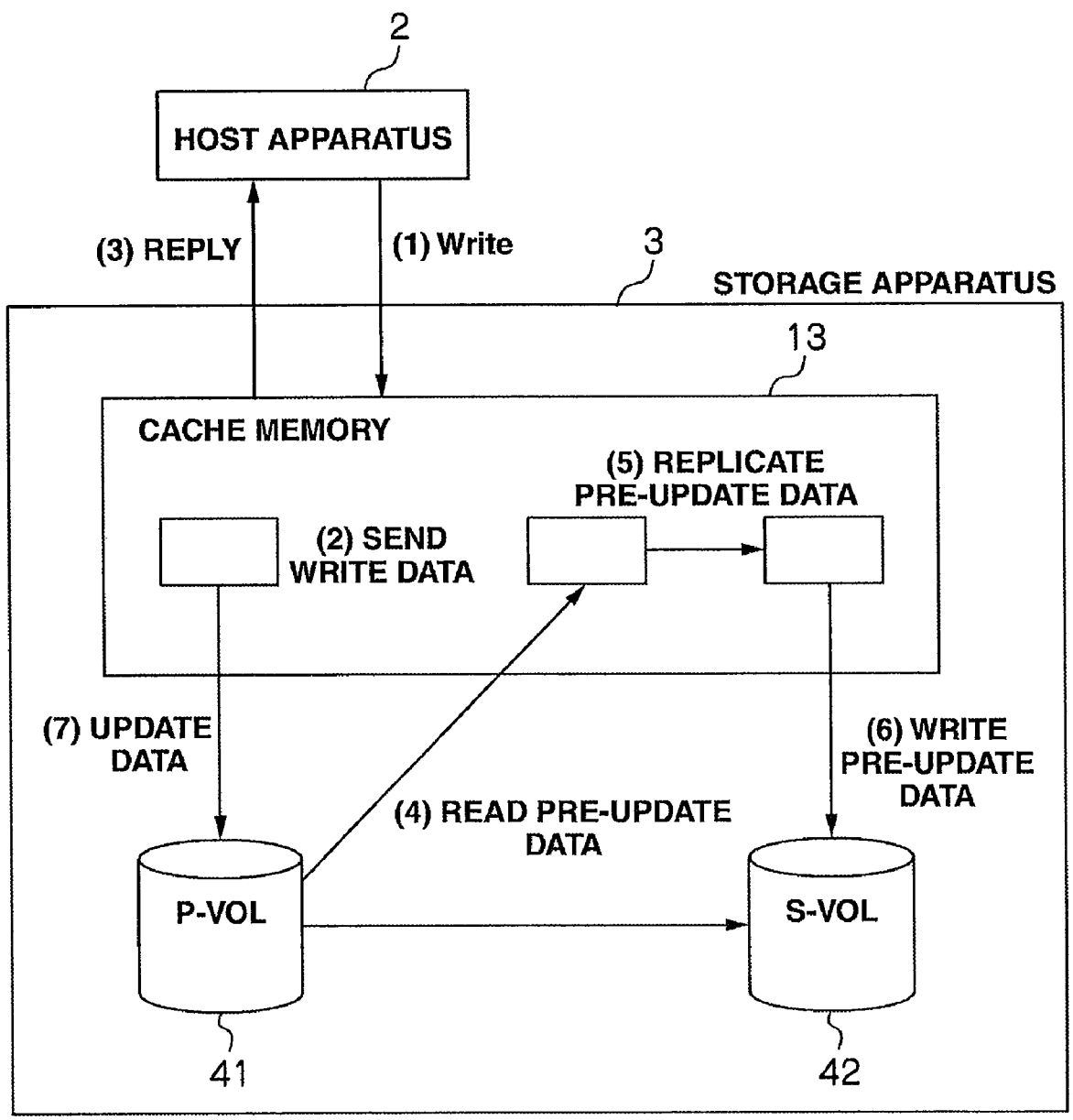
FIG. 17 is a conceptual diagram explaining a write processing flow of writing data into a primary volume after replying to a split command.

FIG. 16 is an example of a flowchart showing the specific processing routine of the CPU 12 of the storage apparatus 3 concerning the write processing to the primary volume 41 after replying to a split command of the storage apparatus 3 in the storage system 1. FIG. 17 is an example of a conceptual diagram showing the write processing flow to the primary volume 41 in the storage apparatus 3.

With the backup method of this embodiment, since a split command completion reply is issued in response to the split command from the host apparatus 2 before the data replication from the primary volume 41 to the secondary volume 42 is complete, data replication from the primary volume 41 to the secondary volume 42 is being performed in the background, and the reflection of data in the secondary volume 42 is incomplete.

Thus, with the backup method of this embodiment, if a write command is issued from the host apparatus 2 to the primary volume 41 after the split command completion reply is issued, it is necessary to check whether the area to be written according to the write command has already been replicated in the secondary volume 42. Moreover, with the backup method of this embodiment, when writing data from the primary volume 41 to the secondary volume 42, it is necessary to confirm whether the formatting of the area to be written is complete.

With the storage system 1 of this embodiment, if data in the primary volume 41 is to be written in an area that has not been replicated to the secondary volume 42 according to the write command, the writing of data of the received write command into the disk device 7 of the secondary volume 42 from the cache memory 13 is inhibited. With the storage system 1 of this embodiment, data is read from the disk device 7 of the primary volume 41 into the cache memory 13, written into the disk device 7 of the secondary volume 42, and the writing of data in the cache memory 13 into the disk device 7 of the primary volume 41 is permitted.

With the storage system 1 of this embodiment, the reflection status of the data replication from the primary volume 41 to the secondary volume 42 is managed with the replication management bitmap 23, and the corresponding flags of the replication management bitmap 23 are changed to "OFF" at the point in time that data replication is performed to the secondary volume 42. With the storage system 1 of this embodiment, in order to prevent the write data in the cache memory 13 from being written into the disk device 7 of the primary volume 41, the flags of the write inhibition column 21C of the segment management table 21 existing for each data segment are set to "ON (1)." Thereby, it is possible to effectively prevent the writing of data into the disk device 7 of the primary volume of that segment, and continue storing such data in the cache memory 13. This is now explained with reference to the flowchart.

When the CPU 12 receives a write command to the primary volume 41 from the host apparatus 2 (FIG. 17 (1)), it executes the control program 34 and, according to the write processing routine RT5 to the primary volume 41 after replying to the split command of the storage apparatus 3 shown in FIG. 16, stores the received write data in the cache memory 13 (SP41) (FIG. 17 (2)).

Subsequently, the CPU 12 sends a completion reply of the write command to the host apparatus 2 while the processing of the write command is incomplete (SP42) (FIG. 17 (3)). The CPU 12 thereafter refers to the replication management bitmap 23, and checks whether the bits of the area to store the write data are "OFF (0)" (replicated) (SP43). If the bits of the area to store the write data are "OFF (0)" (SP43: YES), the CPU 12 proceeds to step SP52. Meanwhile, if the bits of the area to store the write data are not "OFF (0)" (SP43: NO), the CPU 12 changes the write prohibition flag of the segment management table 21 managing the control information of the segment corresponding to the area to store the write data to "ON (1)," and inhibits the writing of the write data into the disk device 7 of the primary volume 41 (SP44).

Subsequently, the CPU 12 reads data of the corresponding area from the disk device 7 of the primary volume 41 into the cache memory 13, and creates write data to be written into the secondary volume 42 (SP45) (FIG. 17 (4) (5)). The CPU 12 thereafter changes the bits of the area to store the write data of the replication management bitmap 23 to "OFF (0)" (SP46). Then, the CPU 12 changes the write prohibition flag of the segment management table 21 of the area to store the segment of the write data to "OFF (0)" (SP47).

Subsequently, the CPU 12 refers to the format management bitmap 22 of the secondary volume 42, and checks whether the bits of the area to store the write data to be written into the secondary volume 42 are "OFF (0)" (formatted) (SP48). If the bits of the area to store the write data to be written into the secondary volume 42 are "OFF (0)" (SP48: YES), the CPU 12 proceeds to step SP51. Meanwhile, if the bits of the area to store the write data to be written into the secondary volume 42 are not "OFF (0)" (SP48: NO), the CPU 12 formats that area (SP49).

Subsequently, the CPU 12 changes the bits of the area to store the write data to be written into the secondary volume 42 of the format management bitmap 22 to "OFF (0)" (formatted) (SP50). The CPU 12 thereafter writes the write data into the disk device 7 of the secondary volume 42 (SP51) (FIG. 17 (6)). Then, the CPU 12 writes the write data into the disk device 7 of the primary volume 41 asynchronously (SP52).

Eventually, the CPU 12 thereafter ends the write processing routine RT5 to the primary volume 41 after replying to the split command of the storage apparatus 3 shown in FIG. 16 (SP53).

Figure 18:
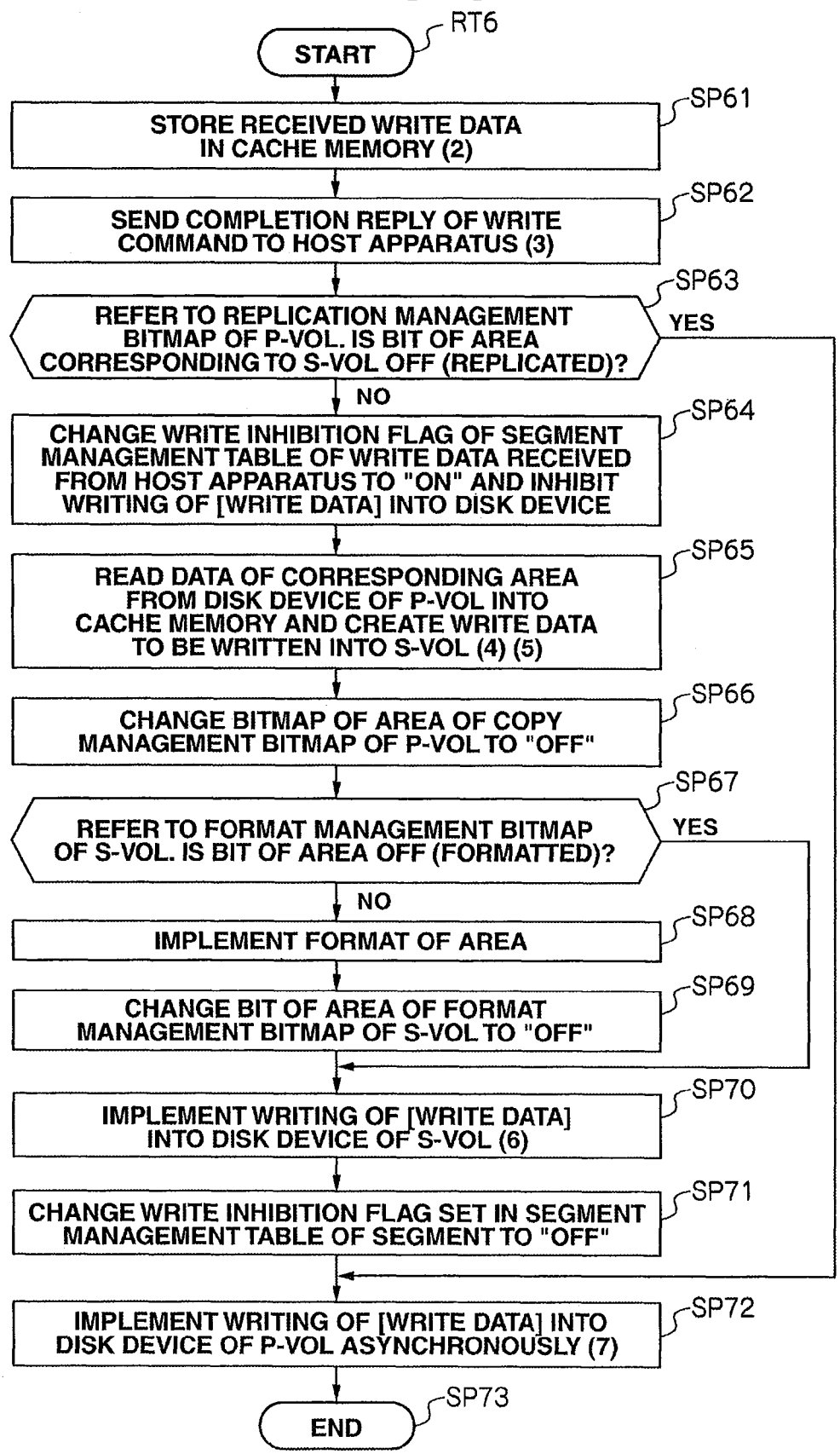
FIG. 18 is a flowchart showing a write processing routine of writing data into a secondary volume after replying to a split command.
Figure 19:
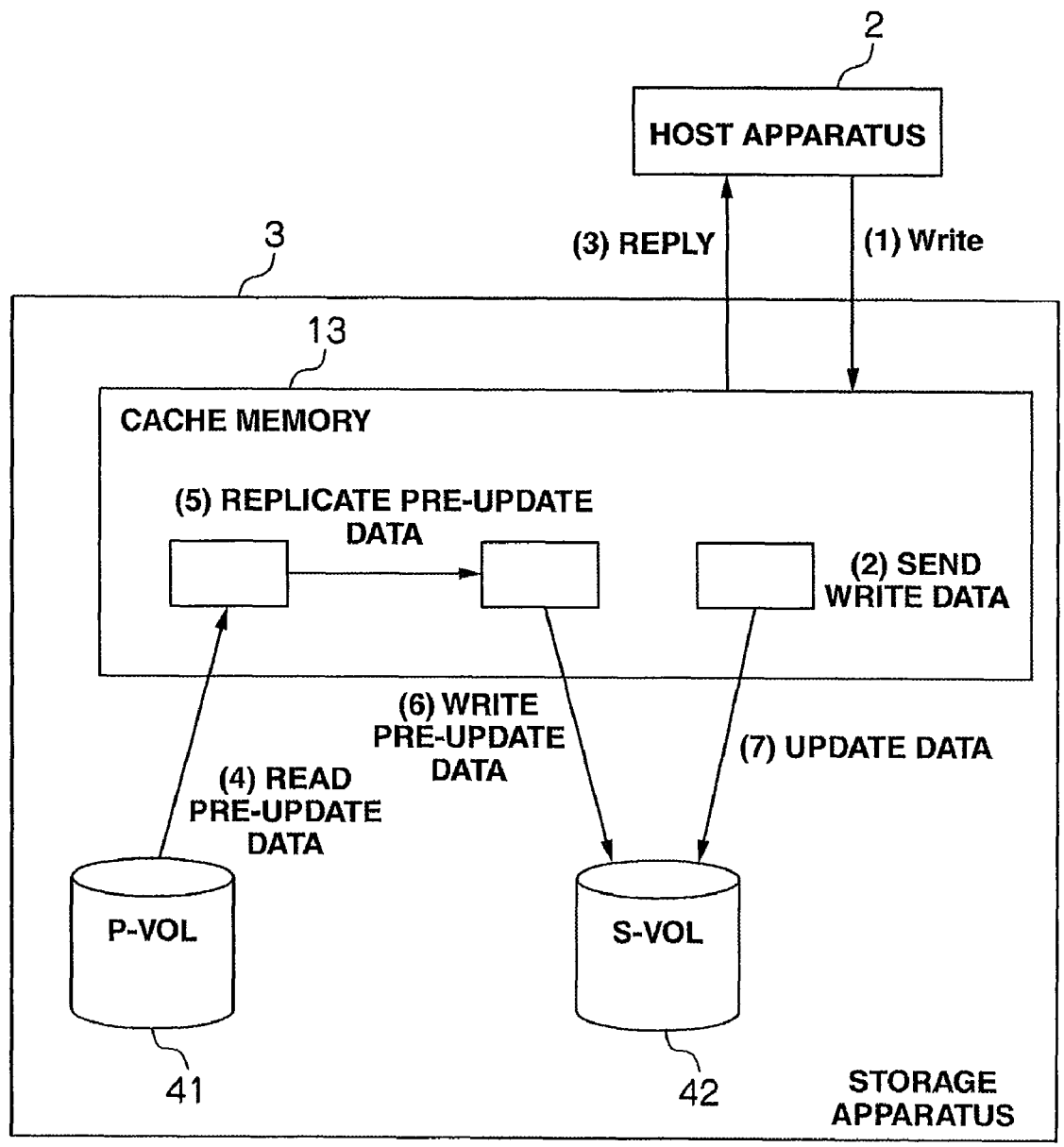
FIG. 19 is a conceptual diagram explaining a write processing flow of writing data into a secondary volume after replying to a split command.

FIG. 18 is an example of a flowchart showing the specific processing routine of the CPU 12 of the storage apparatus 3 concerning the write processing to the secondary volume 42 after replying to a split command of the storage apparatus 3 in the storage system 1. FIG. 19 is an example of a conceptual diagram showing the write processing flow to the secondary volume 42 in the storage apparatus 3.

When the CPU 12 receives a write command to the secondary volume 42 from the host apparatus 2 (FIG. 19 (1)), it executes the control program 34 and, according to the write processing routine RT6 to the secondary volume 42 after replying to the split command of the storage apparatus 3 shown in FIG. 18, stores the received write data in the cache memory 13 (SP61) (FIG. 19 (2)).

Subsequently, the CPU 12 sends a completion reply of the write command to the host apparatus 2 (SP62) (FIG. 19 (3)). The CPU 12 thereafter refers to the replication management bitmap 23, and checks whether the bits of the area of the primary volume 41 corresponding to the area of the secondary volume 42 to store the write data are "OFF (0)" (replicated) (SP63). If the bits of the area to store the write data are "OFF (0)" (SP63: YES), the CPU 12 proceeds to step SP72. Meanwhile, if the bits of the area to store the write data are not "OFF (0)" (SP63: NO), the CPU 12 changes the write prohibition flag of the segment management table 21 existing for each segment of write data received from the host apparatus 2 to "ON (1)," and inhibits the writing of the write data into the disk device 7 of the secondary volume 42 (SP64).

Subsequently, the CPU 12 reads data of the corresponding area from the disk device 7 of the primary volume 41 into the cache memory 13, and creates write data to be written into the secondary volume 42 (SP65) (FIG. 19 (4) (5)). The CPU 12 thereafter changes the bits of the area of the primary volume 41 corresponding to the area of the secondary volume 42 to store the write data of the replication management bitmap 23 to "OFF (0)" (SP66).

Subsequently, the CPU 12 refers to the format management bitmap 22 of the secondary volume 42, and checks whether the bits of the area to store the write data to be written into the secondary volume 42 are "OFF (0)" (formatted) (SP67). If the bits of the area to store the write data to be written into the secondary volume 42 are "OFF (0)" (SP67: YES), the CPU 12 proceeds to step SP70. Meanwhile, if the bits of the area to store the write data to be written into the secondary volume 42 are not "OFF (0)" (SP67: NO), the CPU 12 formats that area (SP68).

Subsequently, the CPU 12 changes the bits of the area to store the write data to be written into the secondary volume 42 of the format management bitmap 22 to "OFF (0)" (formatted) (SP69). The CPU 12 thereafter writes the write data into the disk device 7 of the secondary volume 42 (SP70) (FIG. 19 (6)). Then, the CPU 12 changes the write prohibition flag of the segment management table 21 of the area to store the segment of the write data to "OFF (0)" (SP71). Then, the CPU 12 writes the write data into the disk device 7 of the secondary volume 42 asynchronously (SP72).

Eventually, the CPU 12 thereafter ends the write processing routine RT6 to the secondary volume 42 after replying to the split command of the storage apparatus 3 shown in FIG. 18 (SP73).

Figure 20:
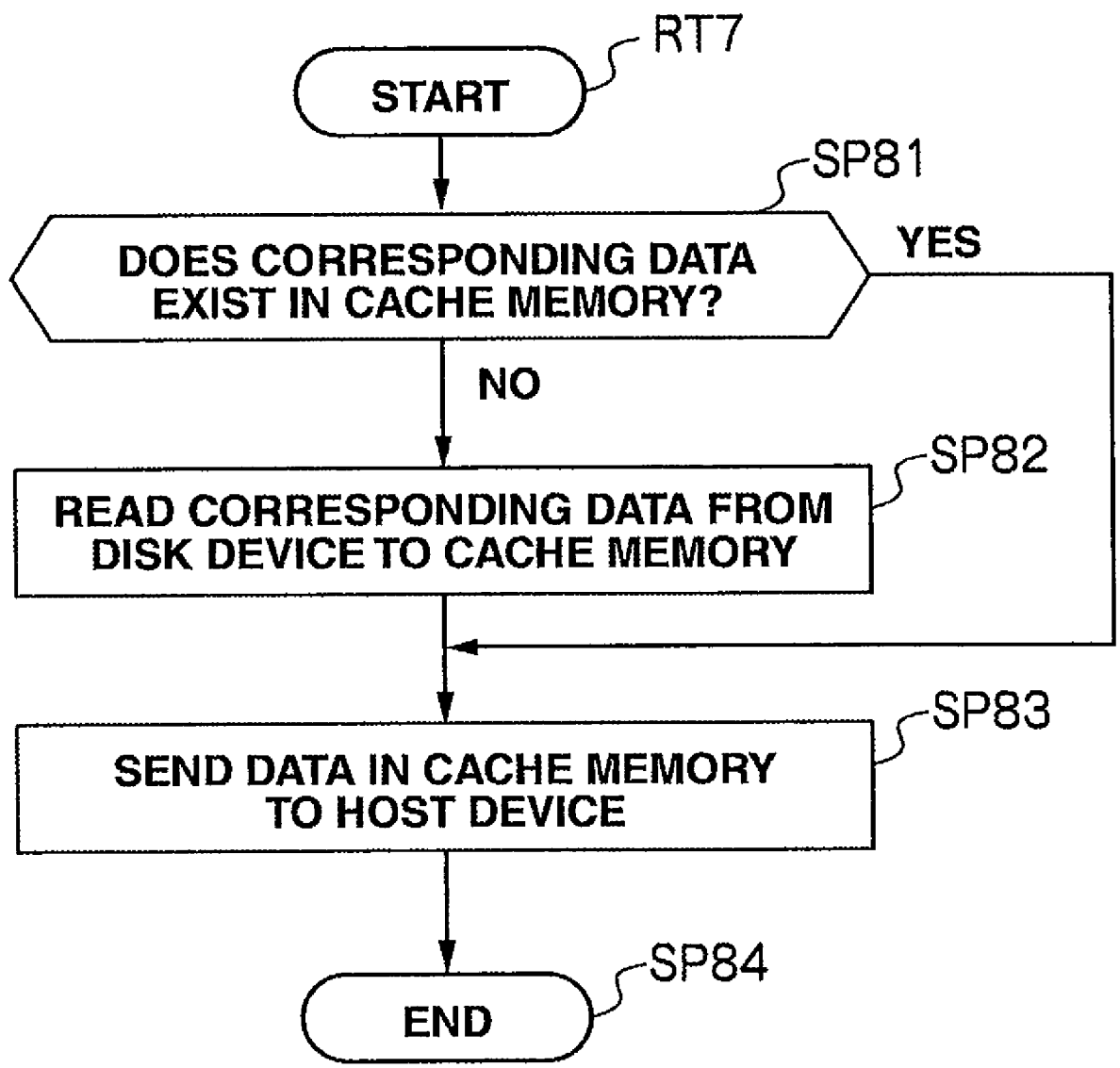
FIG. 20 is a flowchart showing a read processing routine of reading data from a primary volume after replying to a split command.
Figure 21:
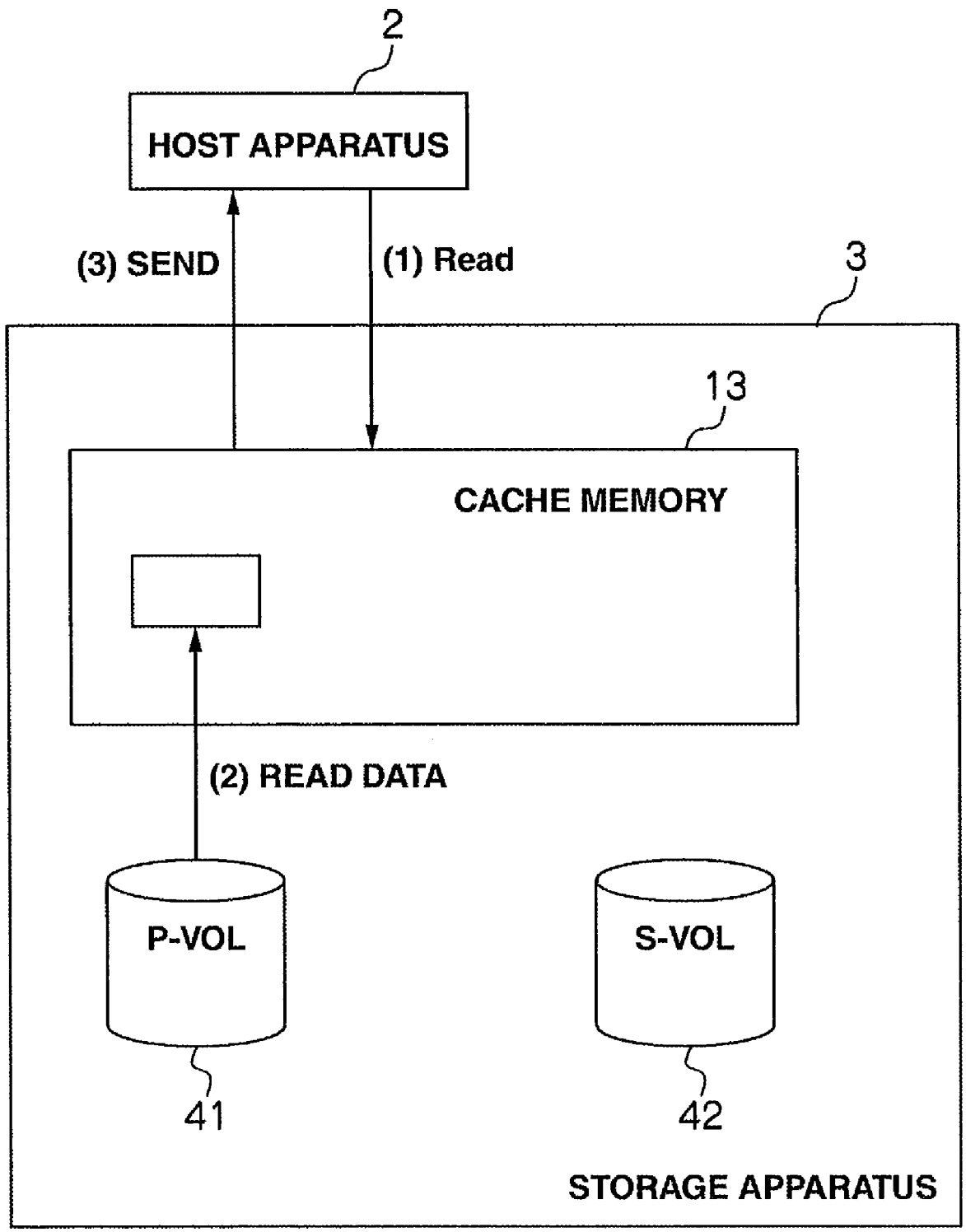
FIG. 21 is a conceptual diagram explaining a read processing flow of reading data from a primary volume after replying to a split command.

FIG. 20 is an example of a flowchart showing the specific processing routine of the CPU 12 of the storage apparatus 3 concerning the read processing of the primary volume 41 after replying to a split command of the storage apparatus 3 in the storage system 1. FIG. 21 is an example of a conceptual diagram showing the read processing flow of the primary volume 41 in the storage apparatus 3.

When the CPU 12 receives a read command of the primary volume 41 from the host apparatus 2 (FIG. 21 (1)), it executes the control program 34 and, according to the read processing routine RT7 of the primary volume 41 after replying to the split command of the storage apparatus 3 shown in FIG. 20, checks whether data corresponding to the read command exists in the cache memory 13 (SP81). If data corresponding to the read command exists in the cache memory 13 (SP82: YES), the CPU 12 proceeds to step SP83. Meanwhile, if data corresponding to the read command does not exists in the cache memory 13 (SP82: NO), the CPU 12 reads the data corresponding to the read command from the disk device 7 of the primary volume 41 into the cache memory 13 (SP82) (FIG. 21 (2)).

Subsequently, the CPU 12 sends the data corresponding to the read command stored in the cache memory 13 to the host apparatus 2 (SP83) (FIG. 21 (3)).

Eventually, the CPU 12 thereafter ends the read processing routine RT7 of the primary volume 41 after replying to the split command of the storage apparatus 3 shown in FIG. 20 (SP84).

Figure 22:
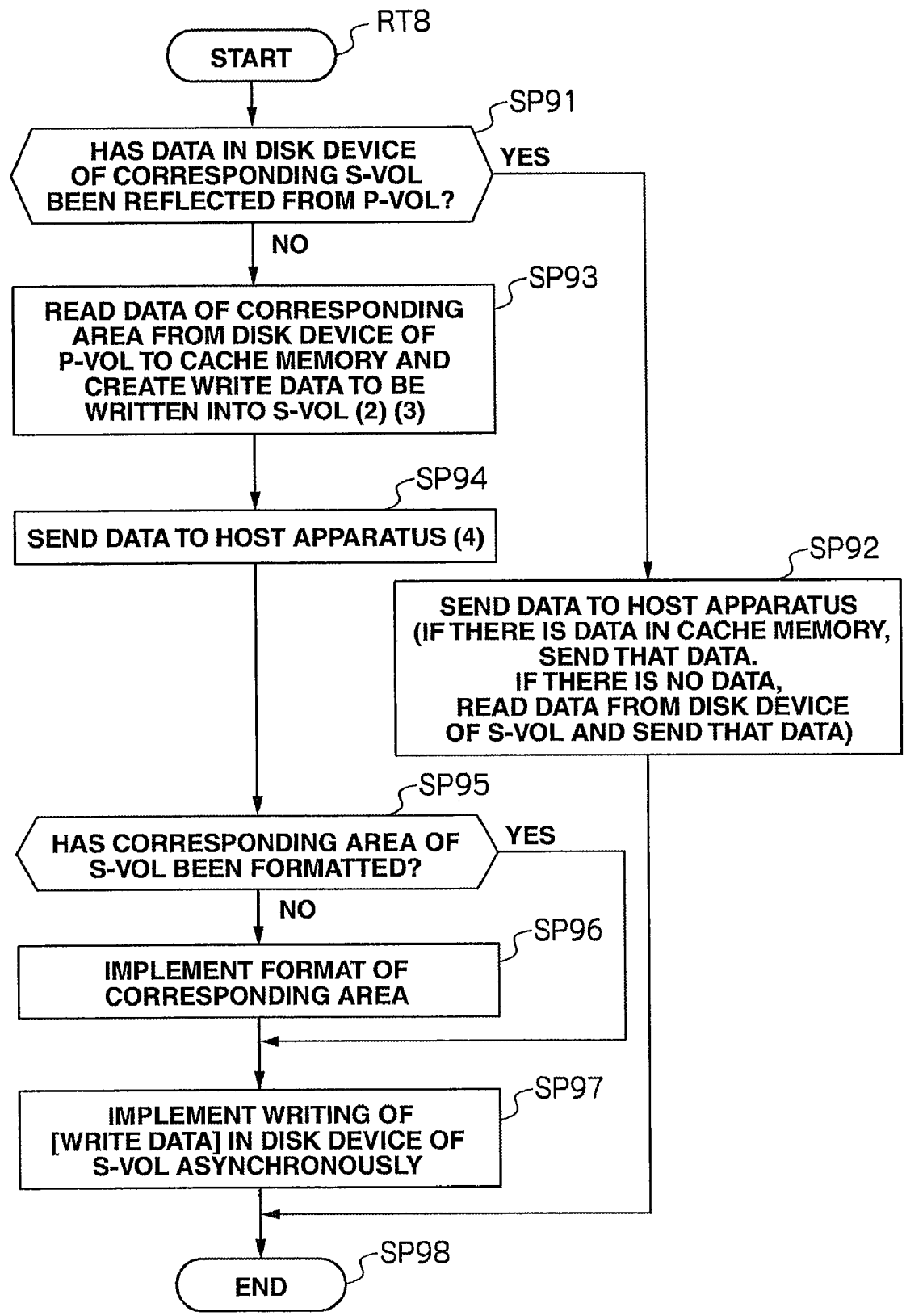
FIG. 22 is a flowchart showing a read processing routine of reading data from a secondary volume after replying to a split command.
Figure 23:
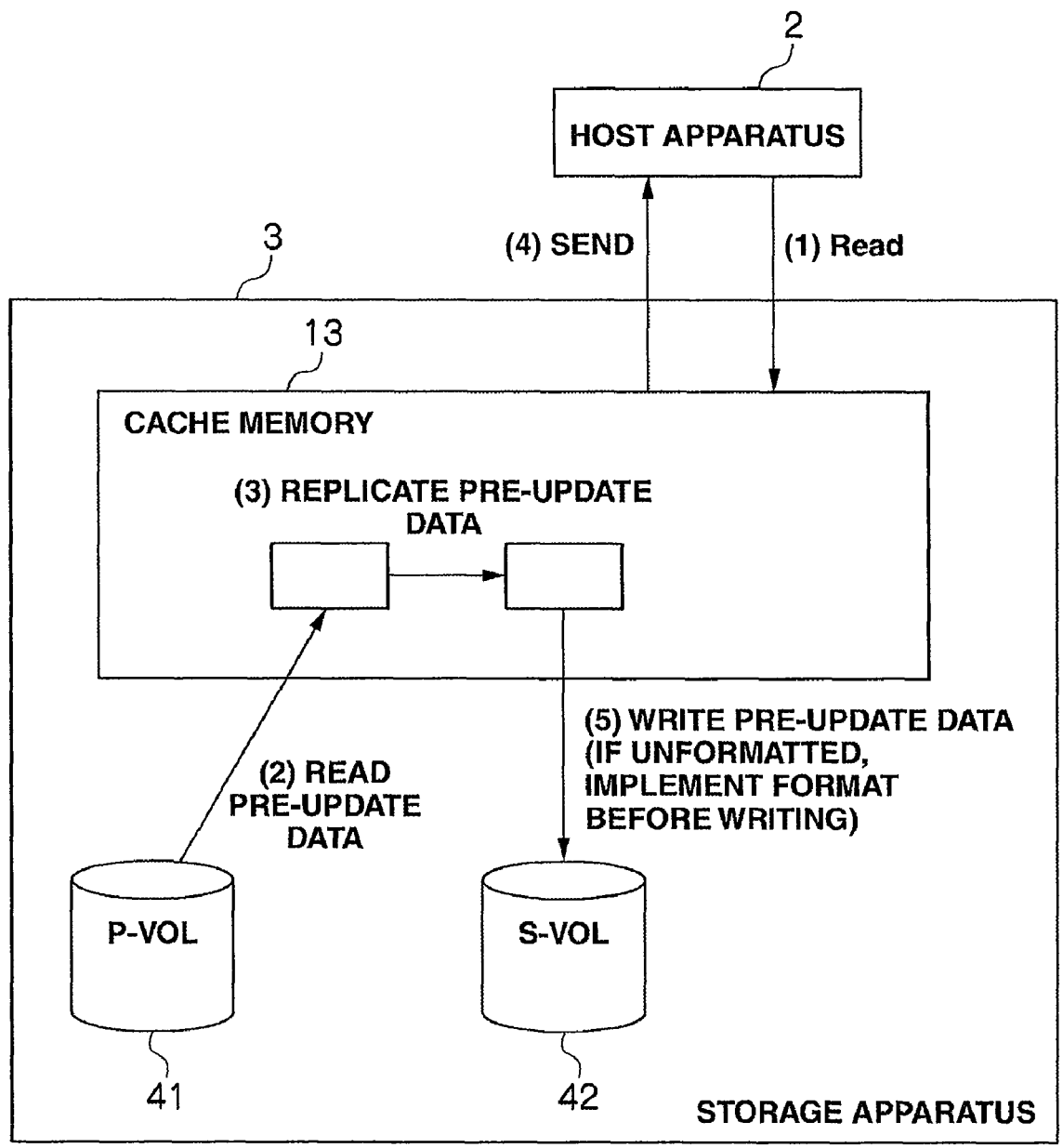
FIG. 23 is a conceptual diagram explaining a read processing flow of reading data from a secondary volume after replying to a split command.

FIG. 22 is an example of a flowchart showing the specific processing routine of the CPU 12 of the storage apparatus 3 concerning the read processing of the secondary volume 42 after replying to a split command of the storage apparatus 3 in the storage system 1. FIG. 23 is an example of a conceptual diagram showing the read processing flow of the secondary volume 42 in the storage-apparatus 3.

With the storage system 1 of this embodiment, when reading data corresponding to the read command regarding an area in which data in the primary volume 41 has not been replicated to the secondary volume 42, the data is read from the disk device 7 of the primary volume 41 into the cache memory 13. With the storage system 1 of this embodiment, write data to be written into the secondary volume 42 is created, the write data to be written into the secondary volume 42 is sent as data corresponding to the read command to the host apparatus 2, and the write data to be written into the secondary volume 42 is written into the disk device 7 of the secondary volume 42.

With the storage system 1 of this embodiment, the reflection status of the data replication from the primary volume 41 to the secondary volume 42 is managed with the replication management bitmap 23, and the corresponding flags of the replication management bitmap 23 are changed to "OFF" at the point in time that data replication is performed to the secondary volume 42. This is now explained with reference to the flowchart.

When the CPU 12 receives a read command of the secondary volume 42 from the host apparatus 2, it executes the control program 34 and, according to the read processing routine RT8 of the secondary volume 42 after replying to the split command of the storage apparatus 3 shown in FIG. 22, checks whether data in the disk device 7 of the secondary volume 42 corresponding to the read command has been reflected from the primary volume 41 (SP91).

If the data has been reflected from the primary volume 41 (SP91: YES), the CPU 12 sends the data to the host apparatus 2 (SP92), and thereafter ends the read processing routine RT8 of the secondary volume 42 after replying to the split command of the storage apparatus 3 shown in FIG. 22 (SP98). Here, if data exists in the cache memory 13, the CPU 12 sends the data, and if data does not exists in the cache memory 13, the CPU 12 reads corresponding data from the disk device 7 of the secondary volume 42 and send such data. Meanwhile, if the data has not been reflected from the primary volume 41 (SP91: NO), the CPU 12 reads the data of the corresponding area of the disk device 7 of the primary volume 41 into the cache memory 13, and creates write data to be written into the secondary volume 42 (SP93) (FIG. 23 (2) (3)).

Subsequently, the CPU 12 sends the write data to be written into the secondary volume 42 as data corresponding to the read command to the host apparatus 2 (SP94).

Subsequently, the CPU 12 refers to the format management bitmap 22 of the secondary volume 42, and checks whether the bits of the area to store the write data to be written into the secondary volume 42 are "OFF (0)" (formatted) (SP95). If the bits of the area to store the write data to be written into the secondary volume 42 are "OFF (0)" (SP95: YES), the CPU 12 proceeds to step SP97. Meanwhile, if he bits of the area to store the write data to be written into the secondary volume 42 are not "OFF (0)" (SP95: NO), the CPU 12 formats that area, and changes the bits of that area to "OFF (0)" (formatted) (SP96). The CPU 12 thereafter writes the write data to be written into the secondary volume 42 into the disk device 7 of the secondary volume 42 asynchronously (SP97).

Eventually, the CPU 12 thereafter ends the read processing routine RT8 of the secondary volume 42 after replying to the split command of the storage apparatus 3 shown in FIG. 22 (SP98).

Figure 24:
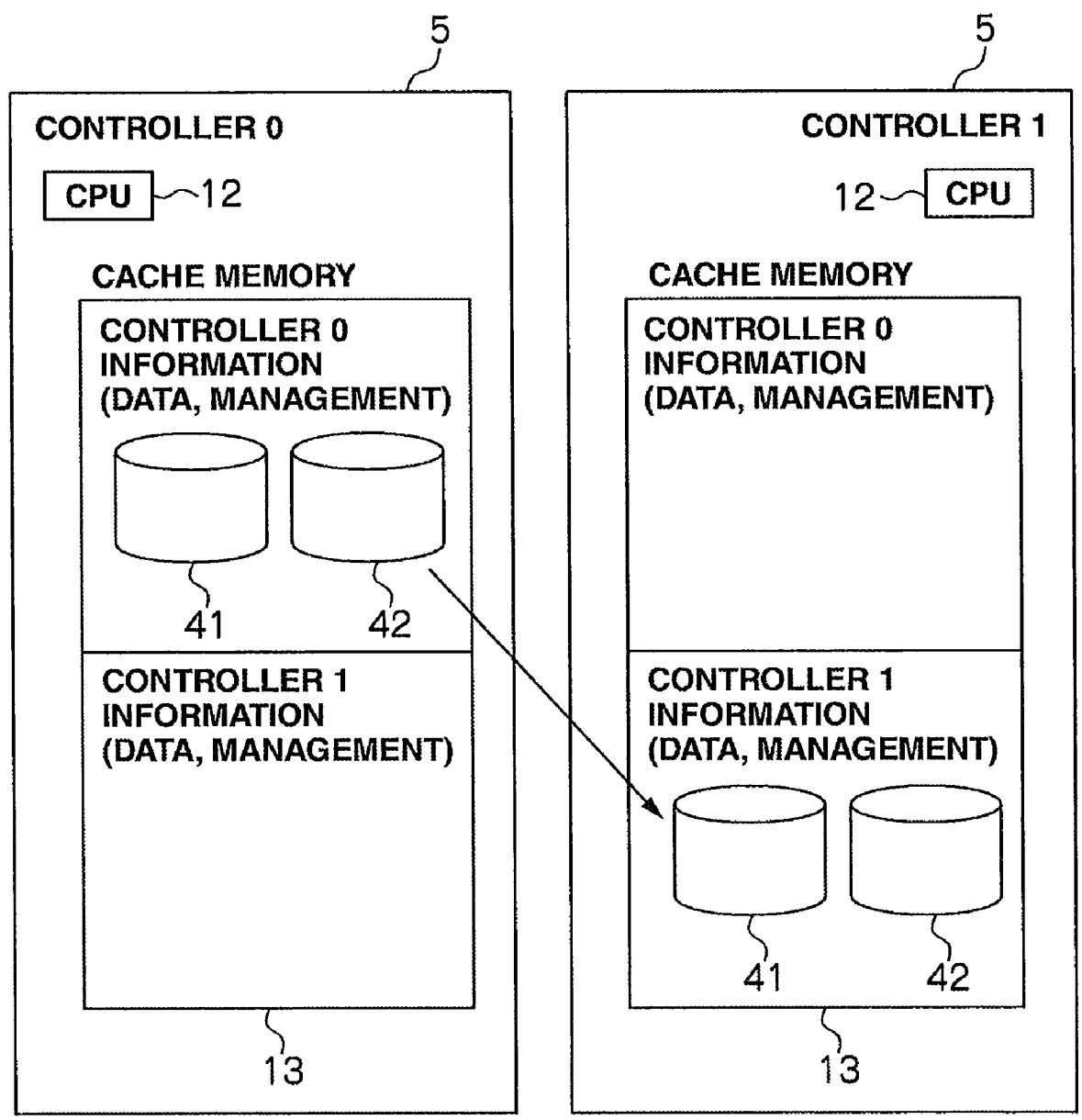
FIG. 24 is a conceptual diagram explaining the sharing of a cache memory, an ownership of a primary volume and a secondary volume as well as the takeover thereof.

FIG. 24 shows an example of sharing the cache memory 13 and the ownership and its takeover of the primary volume 41 and the secondary volume 42. The cache memory 13 of the storage apparatus in this embodiment includes a data area and a management area. The cache memory 13 is provided to each of the two controller units 5 in the storage apparatus 3, and, in order to mutually share information of the other cache memory 13, when writing data and management information stored in the cache memory 13, such data and management information is written into the cache memory 13 of the controller unit 5 to be written with such data and management information, as well as in the cache memory 13 of the other controller unit 5. In the ensuing explanation, for the sake of convenience, one controller unit 5 is referred to as the controller 0 and the other controller unit 5 is referred to as the controller 1.

In other words, with the storage system 1, when the controller 0 receives a write command from the host apparatus 2, data is written into an area of the cache memory 13 of the controller 0 based on a command of the CPU 12 of the controller 0, and into a corresponding area of the cache memory 13 of the controller 1 for the purpose of dual-writing the data.

Meanwhile, with the storage system 1 of this embodiment, the primary volume 41 and the secondary volume 42 exist under the control of the same controller unit 5, and the primary volume 41 and the secondary volume 42 are both controlled with the same controller 0. In other words, with the storage system 1, when moving the ownership to the controller 1 based on a command from the host apparatus 2, it is necessary to move both the primary volume 41 and the secondary volume 42. In connection with this, with the storage system 1, management data of both the primary volume 41 and the secondary volume 42 in the cache memory 13 of the controller 0 is taken over by the controller 1.

Nevertheless, with the storage system 1 of this embodiment, since data replication from the primary volume 41 to the secondary volume 42 is being performed in the background, when the controller 1 is to take over the owner, the data replication is once suspended at the point in time when a certain area in the controller 0 is complete, and the controller 1 thereafter takes over the ownership. With the storage system 1, the controller 1 refers to the format management bitmap 22 and the replication management bitmap 23, and then resumes the data replication.

With the storage system 1 of this embodiment, the same applies to the commands from the host apparatus 2. Specifically, regarding commands with difference in the correspondence in the timing that the commands are received, the command that is being processed is performed until the processing is complete, and regarding commands that were received but are not being processed, the command is not processed and resumed at a timing that the takeover is complete.

Figure 25:
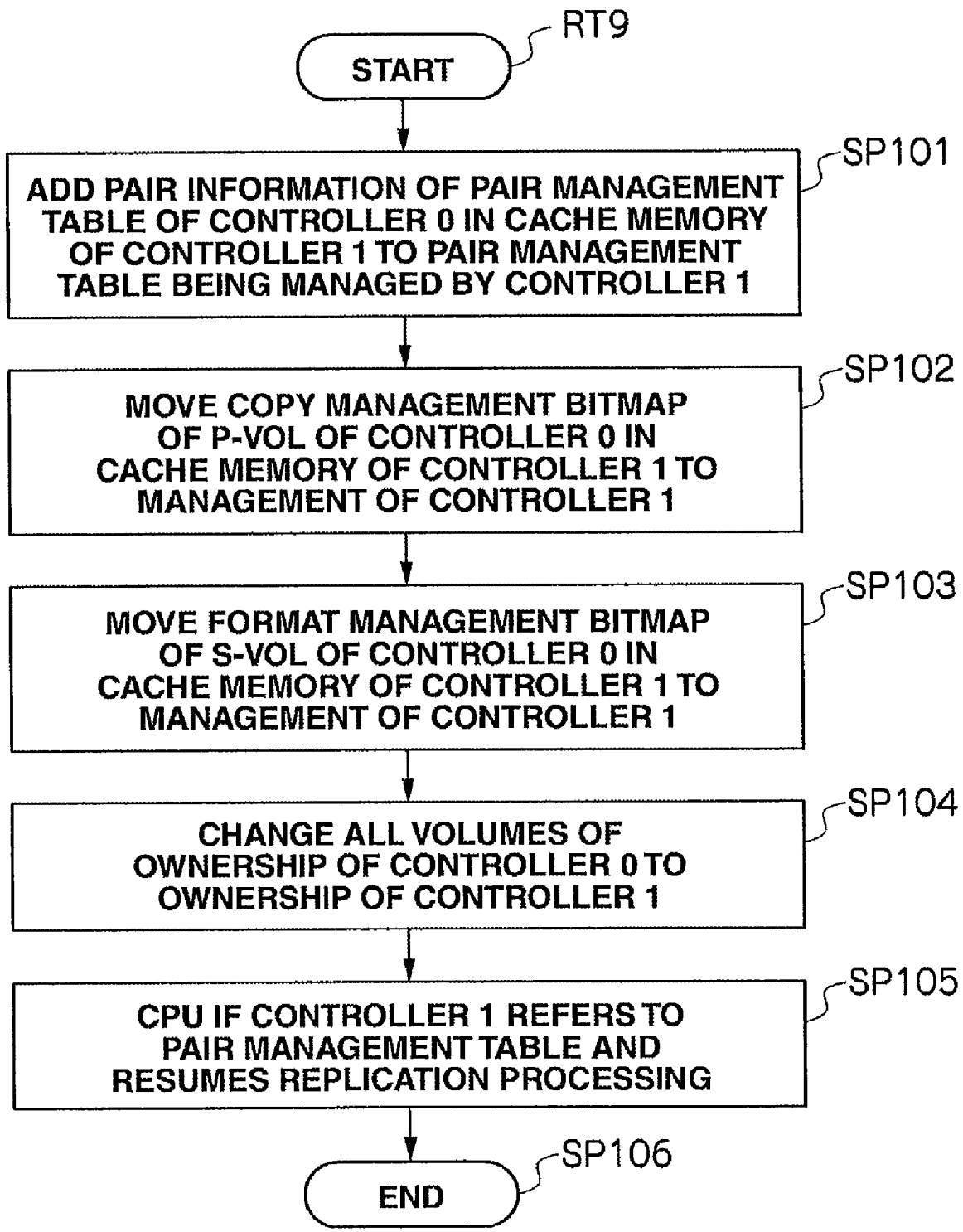
FIG. 25 is a flowchart showing an ownership takeover processing routine of a primary volume and a secondary volume.

FIG. 25 is an example of a flowchart showing the specific processing routine of the CPU 12 of the controller 1 of the storage apparatus 3 concerning the ownership takeover processing of the primary volume 41 and the secondary volume 42 of the storage apparatus 3 in the storage system 1.

With the storage system 1 of this embodiment, if replication from the primary volume 41 to the secondary volume 42 is being controlled in the controller 0, the controller 0 possesses the ownership, and the controller 1 does not perform any kind of control. With the storage system 1, if the controller 0 is subject to a failure or the like under this status, the control is thereby taken over by the controller 1.

Here, with the storage system 1, when a failure in the controller 0 is detected, the controller 1 acquires information of the controller 0 of the cache memory 13 of the controller 1, and takes over the status of the primary volume 41 and the secondary volume 42. Specifically, with the storage system 1, the management of the format management bitmap 22 and the replication management bitmap 23 is changed to the management of the controller 1, and the status of the primary volume 41 and the secondary volume 42 is thereby taken over in the controller 1.

With the storage system 1, the formatting of the secondary volume 42 and the replication from the primary volume 41 to the secondary volume 42 are preformed sequentially from the top, and the formatting and replication of the corresponding area are performed first upon receiving a write command from the host apparatus 2.

With the storage system 1, in the controller 0, the data scheduled to be read from the disk device 7 of the primary volume 41 into the cache memory 13 of the controller 0 and written into the secondary volume 42 is discarded from the perspective of data reliability. With the storage system 1, in the controller 1, the process is resumed from the time that data is read once again from the disk device 7 of the primary volume 41 into the cache memory 13 of the controller 1 according to information of the replication management bitmap 23.

Foremost, with the storage system 1, let it be assumed that the primary volume 41 and the secondary volume 42 are being managed in the controller 0, replication is being implemented in the background, and the controller 0 is subject to a failure at a prescribed timing.

When the CPU 12 of the controller 1 detects an occurrence of a failure in the controller 0, it executes the control program 34 and, according to the ownership takeover processing routine RT9 of the primary volume 41 and the secondary volume 42 shown in FIG. 25, adds the pair information of the pair management table 21 of the controller 0 stored in the cache memory 13 of the controller 1 to the pair information management table 21 being managed by the controller 1 (SP101).

Subsequently, the CPU 12 of the controller 1 moves the replication management bitmap 23 of the primary volume 41 of the controller 0 stored in the cache memory 13 of the controller 1 to the management of the controller 1 (SP102). The CPU 12 of the controller 1 thereafter moves the format management bitmap 22 of the secondary volume 42 of the controller 0 stored in the cache memory 13 of the controller 1 to the control of the controller 1 (SP103).

Subsequently, the CPU 12 of the controller 1 changes all volumes in which the ownership of the ownership management table 24 is the controller 0 to the ownership of the controller 1 (SP104). The CPU 12 of the controller 1 thereafter refers to the pair management table 21, and resumes the replication in the background of the primary volume 41 and the secondary volume 42 (SP105).

Eventually, the CPU 12 thereafter ends the ownership takeover processing routine RT9 of the primary volume 41 and the secondary volume 42 shown in FIG. 25 (SP106).

Figure 26:
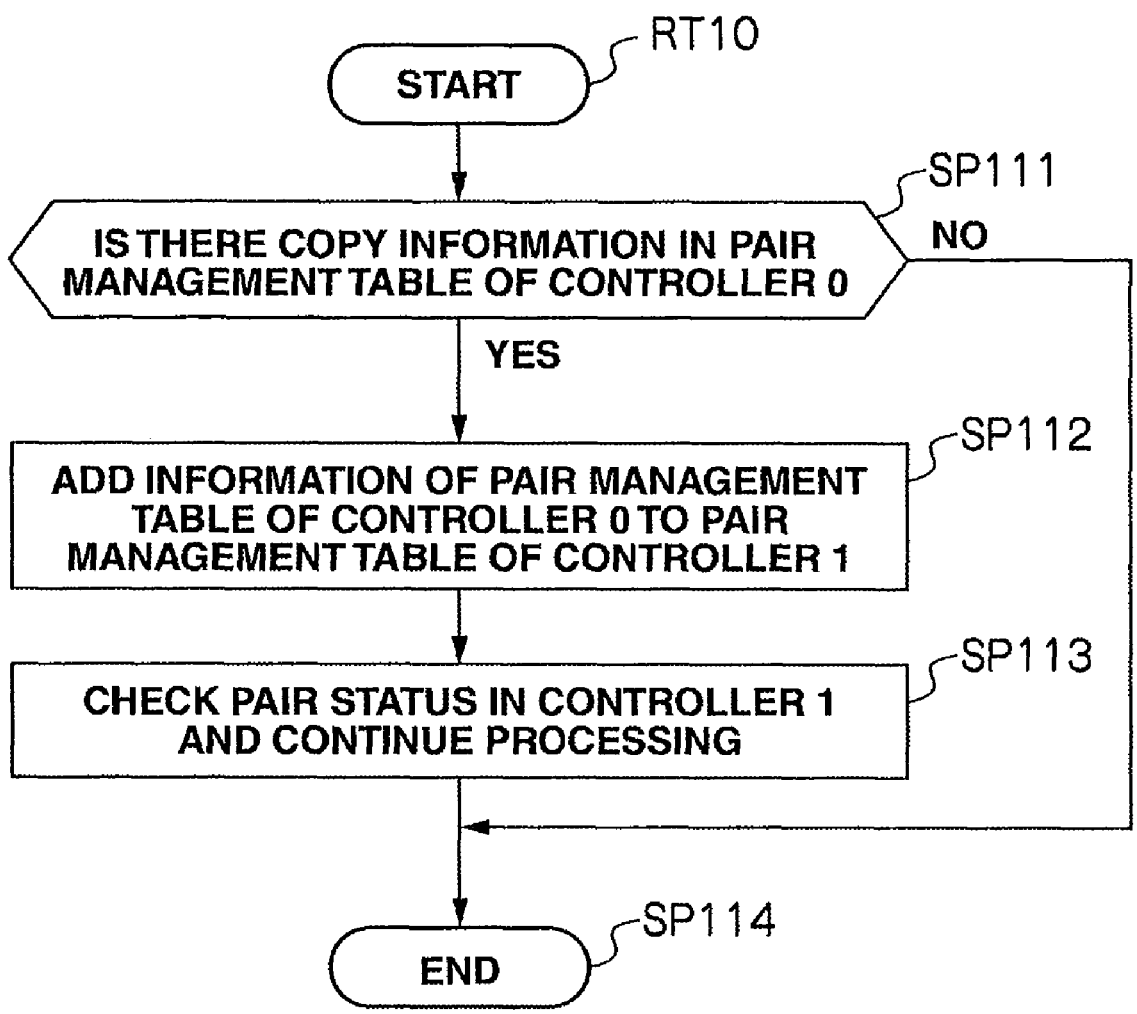
FIG. 26 is a flowchart showing a pair status takeover processing routine to be performed by the controller 1 during a failure of the controller 0 of the storage apparatus.
Figure 27:
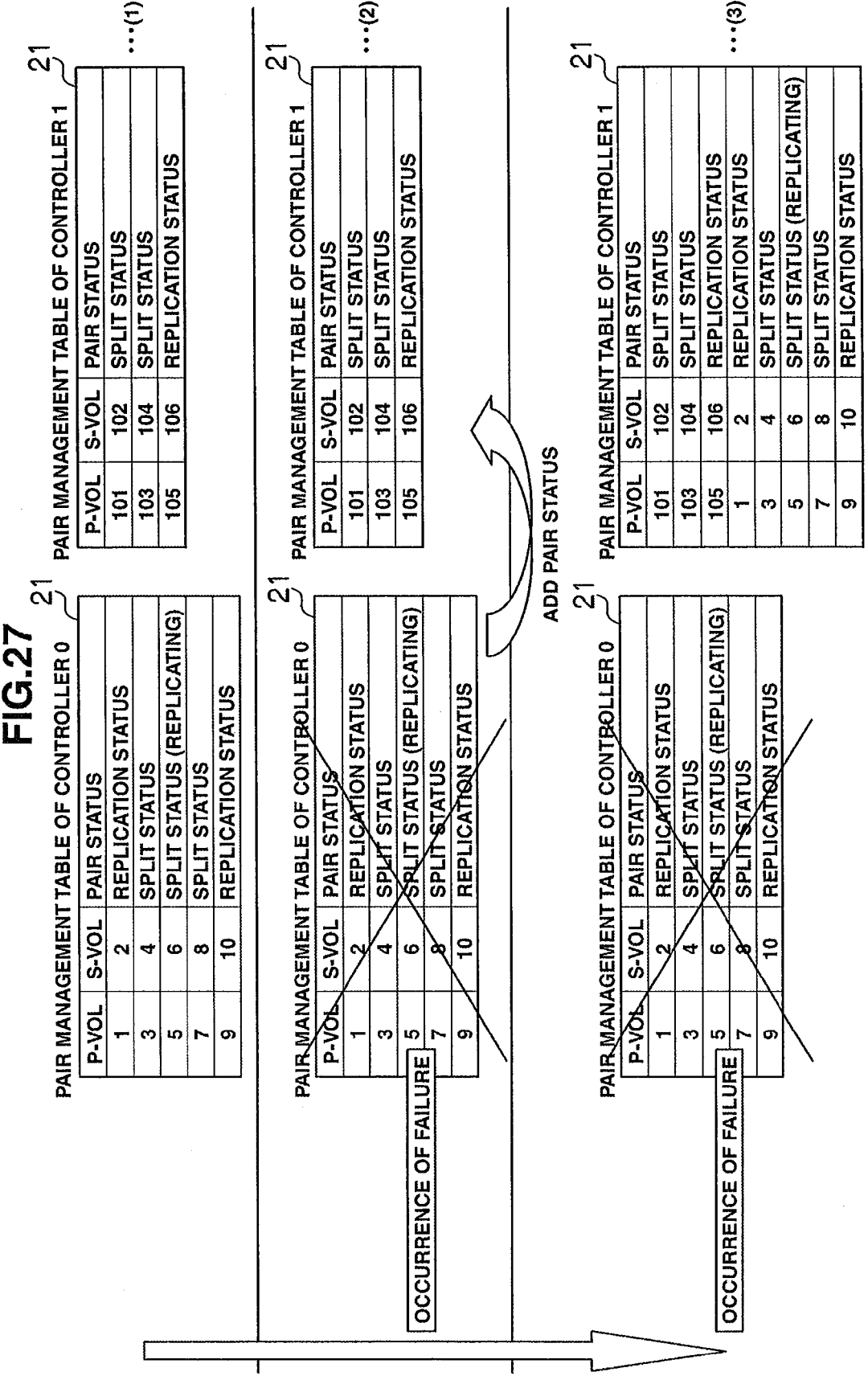
FIG. 27 is a conceptual diagram explaining the addition of a pair status of a pair management table.

FIG. 26 is an example of a flowchart showing the specific processing routine of the CPU 12 of the controller 1 of the storage apparatus 3 concerning the pair status takeover processing performed by the controller 1 when a failure occurs in the controller 0 of the storage apparatus 3 in the storage system 1. FIG. 27 is an example of the conceptual diagram showing the addition of a pair status of the pair management table 21.

Foremost, with the storage system 1, let it be assumed that a pair management table 21 shown in FIG. 27 (1) is stored in the logical memory 14 of the controller 0 and the controller 1.

When the CPU 12 of the controller 1 detects that a failure has occurred in the controller 0 (FIG. 27 (2)), by executing the control program 34 and according to the pair status takeover processing routine RT10 performed by the controller 1 during a failure in the controller 0 shown in FIG. 26, it checks whether there is replication information in the pair management table 21 of the controller 0 (SP111). If there is no replication information in the pair management table 21 of the controller (SP111: NO), the CPU 12 of the controller 1 thereafter ends the pair status takeover processing routine RT10 performed by the controller 1 during a failure in the controller 0 shown in FIG. 26 (SP106). Meanwhile, if there is replication information in the pair management table 21 of the controller (SP111: YES), the CPU 12 of the controller 1 adds information of the pair management table 21 of the controller 0 to the pair management table 21 of the controller 1 (SP112) (FIG. 27 (3)).

Here, with the storage system 1, the pair management table 21 is managed for each controller unit 5, and if a failure or the like occurs in the controller 0, the controller 1 replicates the pair status in the pair management table 21 of the controller 1.

Subsequently, the CPU 12 of the controller 1 checks the pair status in the controller 1 and continues the processing of the primary volume 41 and the secondary volume 42 (SP113).

Eventually, the CPU 12 thereafter ends the pair status takeover processing routine RT10 performed by the controller 1 during a failure in the controller 0 shown in FIG. 26 (SP114).

Figure 28:
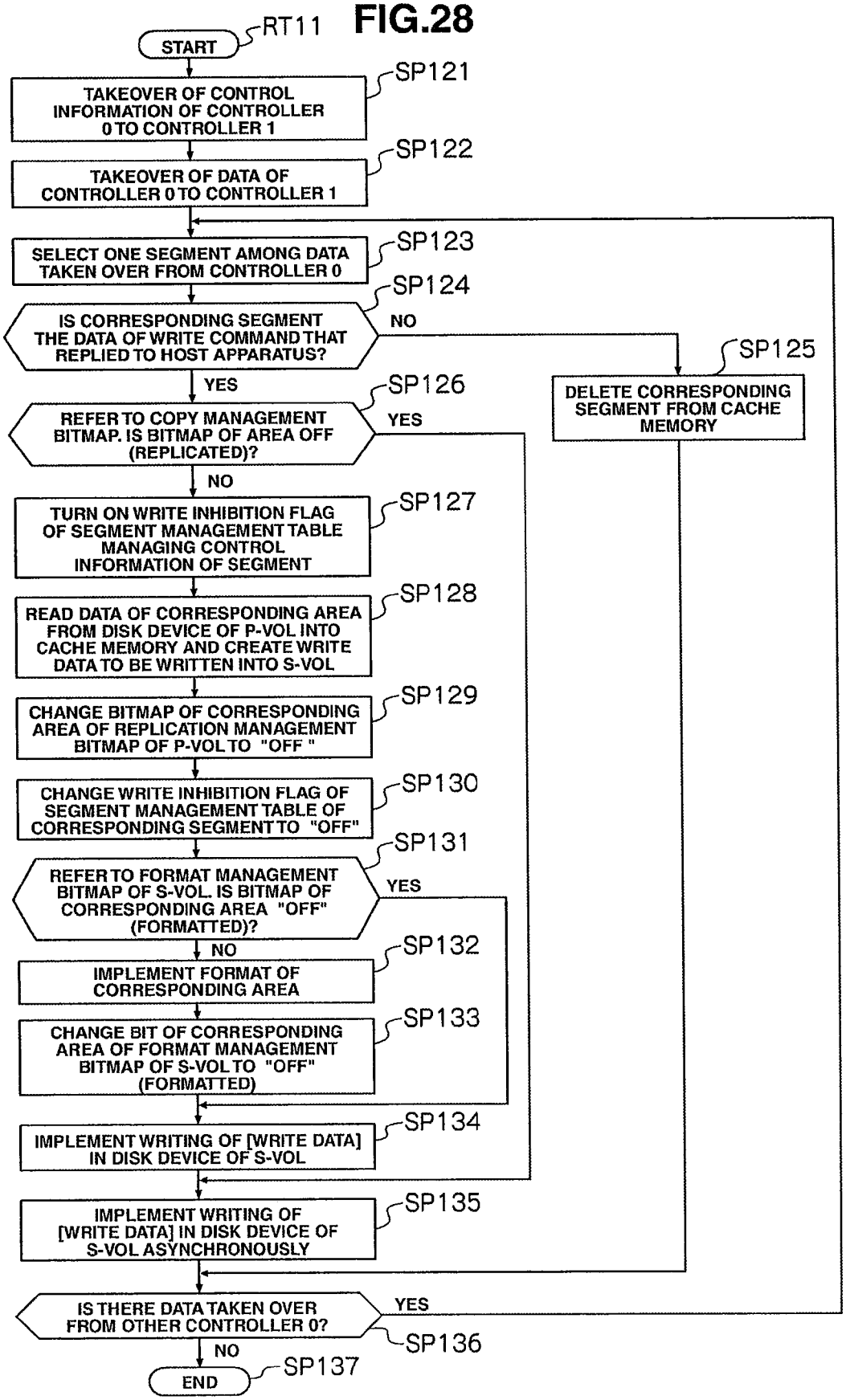
FIG. 28 is a flowchart showing a write processing routine of writing data into a primary volume when a failure occurs in the controller 0 after replying to a split command.

FIG. 28 is an example of a flowchart showing the specific processing routine of the CPU 12 of the controller 1 of the storage apparatus 3 concerning the write processing to the primary volume 41 when a failure occurs in the controller 0 after replying the split command of the storage apparatus 3 in the storage system 1.

With the storage system 1 of this embodiment, if a failure occurs in the controller 0 after replying to the split command, it is necessary to determine whether to write data into the disk device 7 of the primary volume 41 based on whether the controller 0 send a completion reply to the host apparatus 2 regarding the write command from the host apparatus 2 to the primary volume 41. Here, with the storage system 1, if the controller 0 has already sent a completion reply to the host apparatus 2, writing into the disk device 7 of the primary volume 41 must be guaranteed.

With the storage system 1 of this embodiment, if a failure occurs in the controller 0, data of the cache memory 13 of the controller 0 is taken over by the controller 1, the CPU 12 of the controller 1 checks whether the sending of the completion reply to the host apparatus 2 for each data is complete, and processing for writing the data in the disk device 7 or discarding the data is performed. This is now explained with reference to the following flowchart.

When the CPU 12 of the controller 1 detects the occurrence of a failure in the controller 0, it executes the control program 34 and according to the write processing routine RT11 to the primary volume 41 when a failure occurs in the controller 0 after replying to the split command shown in FIG. 28, takes over the control information (for instance, format management bitmap 22, replication management bitmap 23, pair management table 31, etc.) stored in the cache memory 13 and the local memory 14 of the controller 0 via replication or the like, and stores such control information in the cache memory 13 and the local memory 14 of the controller 1 (SP121).

Subsequently, the CPU 12 of the controller 1 takes over the data (for instance, segment, segment management table 21, etc.) stored in the cache memory 13 of the controller 0 via replication or the like, and stores such data in the cache memory 13 of the controller 1 (SP122).

Subsequently, the CPU 12 of the controller 1 selects one segment among the data taken over from the controller 0 (SP123).

Subsequently, the CPU 12 of the controller 1 checks whether the selected segment is the data of the write command that sent the reply completion to the host apparatus 2 (SP124). Here, the CPU 12 of the controller 1 determines in which write command job the segment was secured by referring to the segment securement table 32, and determines whether the reply completion has been sent to the host apparatus 2 based on the host command management table 33 managing the status regarding which write command job has been processed how far. If the selected segment is not the data of the write command that sent the reply completion to the host apparatus 2 (SP124: NO), the CPU 12 of the controller 1 deletes the segment from the cache memory 13 of the controller 1 (SP125).

Meanwhile, if the selected segment is the data of the write command that sent the reply completion to the host apparatus 2 (SP124: YES), the CPU 12 of the controller 1 refers to the replication management bitmap 23, and checks whether the bits of the area to store write data of the selected segment are "OFF (0)" (replicated) (SP126). If the bits of the area to store write data of the selected segment are "OFF (0)" (SP126: YES), the CPU 12 of the controller 1 proceeds to step SP135. Meanwhile, if the bits of the area to store write data of the selected segment are not "OFF (0)" (SP126: NO), the CPU 12 of the controller 1 changes write prohibition flag of the segment management table 21 managing the control information of the selected segment to "ON (1)," and inhibits the writing of the write data into the disk device 7 of the primary volume 41 (SP127).

Subsequently, the CPU 12 of the controller 1 reads data of the corresponding area from the disk device 7 of the primary volume 41 from the cache memory 13 and creates write data to be written into the secondary volume 42 (SP128). The CPU 12 of the controller 1 thereafter changes the bit of the area to store the write data of the replication management bitmap 23 to "OFF (0)" (SP129). Then, the CPU 12 of the controller 1 changes the write prohibition flag of the segment management table 21 of the area to store the segment of the write data to "OFF (0)" (SP130).

Subsequently, the CPU 12 of the controller 1 refers to the format management bitmap 22 of the secondary volume 42, and checks whether the bits of the area to store the write data to be written into the secondary volume 42 are "OFF (0)" (formatted) (SP131). If the bits of the area to store the write data to be written into the secondary volume 42 are "OFF (0)" (SP131: YES), the CPU 12 of the controller 1 proceeds to step SP134. Meanwhile, if the bits of the area to store the write data to be written into the secondary volume 42 are not "OFF (0)" (SP131: NO), the CPU 12 of the controller 1 formats that area (SP132).

Subsequently, the CPU 12 of the controller 1 changes the bits of the area to store the write data to be written into the secondary volume 42 of the format management bitmap 22 to "OFF (0)" (formatted) (SP133). The CPU 12 of the controller 1 thereafter writes the write data into the disk device 7 of the secondary volume 42 (SP134). Then, the CPU 12 of the controller 1 writes the write data into the disk device 7 of the primary volume 41 asynchronously (SP135).

Subsequently, the CPU 12 of the controller 1 checks whether data taken over from another controller 0 exists (SP136). If data taken over from another controller 0 exists (SP136: YES), the CPU 12 of the controller 1 returns to step SP123, selects one segment among the data taken over from the controller 0 (SP123), and thereafter repeats the same processing as the processing described above (SP123 to SP136). Meanwhile, if data taken over from another controller 0 does not exist (SP136: NO), the CPU 12 thereafter ends the write processing routine RT11 to the primary volume 41 when a failure occurs in the controller 0 after replying to the split command shown in FIG. 28 (SP137).

With the storage system 1, if a failure occurs in the controller 1, the CPU 12 of the controller 0 performs the same processing as a matter of course.

Figure 29:
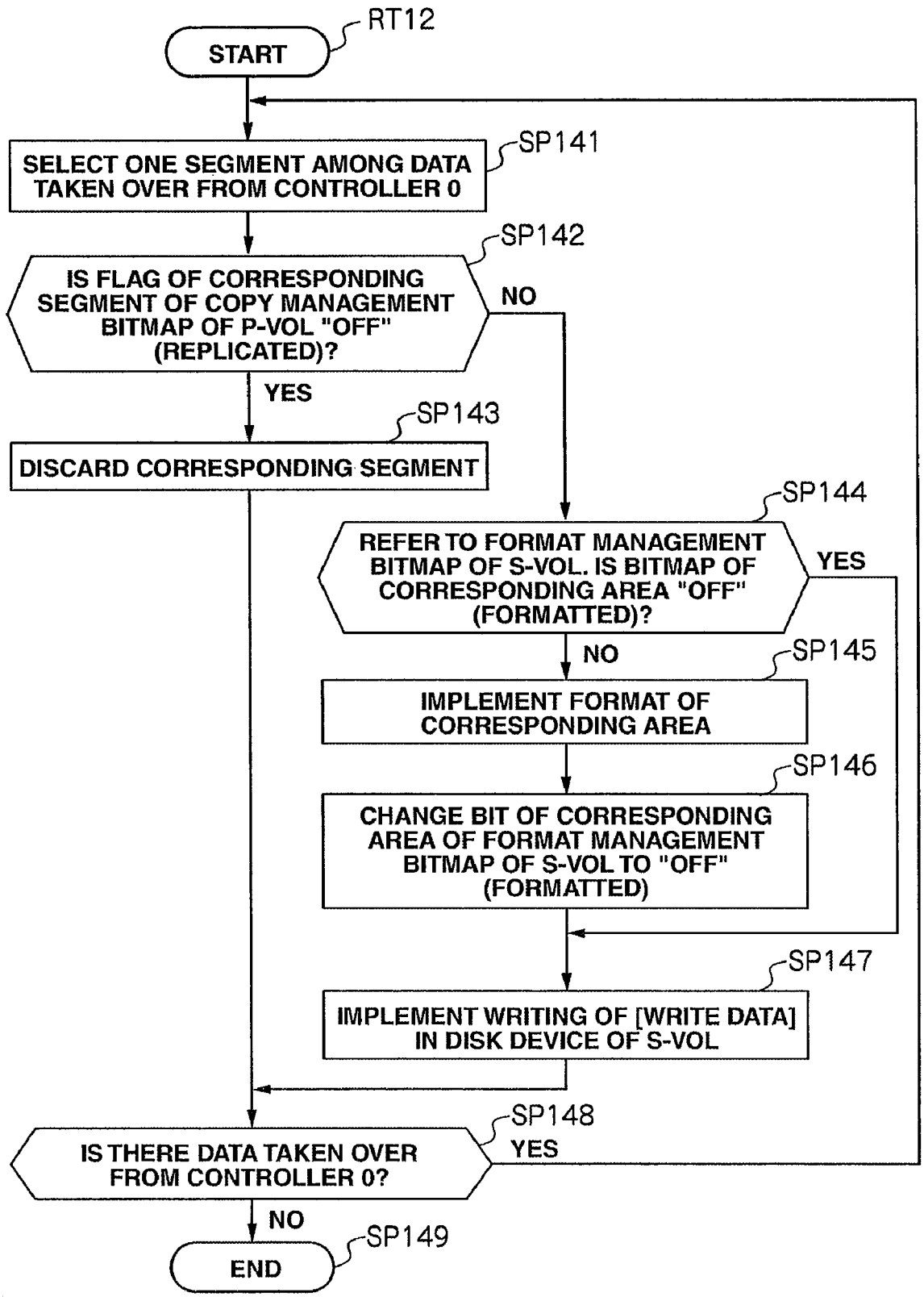
FIG. 29 is a flowchart showing a read processing routine of reading data from a secondary volume when a failure occurs in the controller 0 after replying to a split command.

FIG. 29 is an example of a flowchart showing the specific processing routine of the CPU 12 of the controller 1 of the storage apparatus 3 concerning the read processing to the secondary volume 42 when a failure occurs in the controller 0 after replying the split command of the storage apparatus 3 in the storage system 1.

With the storage system 1 of this embodiment, when reading data from the secondary volume 42, the data reading and data replication from the primary volume 41 in the storage apparatus 3 are performed for previously replicating data that needs to be replicated from the primary volume 41 to the secondary volume 42 under normal circumstances. Thus, with the storage system 1 of this embodiment, even if a failure occurs in the controller 0 during the read processing of the secondary volume 42 after replying to the split command, the replication is resumed based on the replication management bitmap 23 of the primary volume 41 that was taken over.

When the CPU 12 of the controller 1 takes over the control information and data stores in the cache memory 13 and the local memory 14 of the controller 0 via replication or the like, and stores such control information and data in the cache memory 13 and the local memory 14 of the controller 1 (SP121, SP122), it executes the control program 34 and according to the read processing routine RT12 of the secondary volume 42 when a failure occurs in the controller 0 after replying to the split command shown in FIG. 29, selects one segment among the data taken over from the controller 0 (SP141).

Subsequently, the CPU 12 of the controller 1 refers to the replication management bitmap 23 of the primary volume 41, and checks whether the bits of the area of the primary volume 41 corresponding to the area of the secondary volume 42 storing the selected segment are "OFF (0)" (replicated) (SP142). If the bits of that area are "OFF (0)" (SP142: YES), the CPU 12 discards the segment (SP143). Meanwhile, if the bits of that area are not "OFF (0)" (SP142: NO), the CPU 12 refers to the format management bitmap 22 of the secondary volume 42, and checks whether the bits of the area storing the selected segment are "OFF (0)" (formatted) (SP144). If the bits of that area are "OFF (0)" (SP144: YES), the CPU 12 of the controller 1 proceeds to step SP147. Meanwhile, if the bits of that area are not "OFF (0)" (SP144: NO), the CPU 12 of the controller 1 formats that area (SP145).

Subsequently, the CPU 12 of the controller 1 changes the bits of the area storing the selected segment of the format management bitmap 22 to "OFF (0)" (formatted) (SP146). The CPU 12 of the controller 1 thereafter writes the data of the selected segment into the disk device 7 of the secondary volume 42 (SP147).

Subsequently, the CPU 12 of the controller 1 checks whether data taken over by another controller 0 exists (SP148). If data taken over by another controller 0 exists (SP148: YES), the CPU 12 of the controller 1 returns to step SP141, selects one segment among the data taken over from the controller 0 (SP141), and thereafter repeats the same processing as the processing described above (SP141 to SP148). Meanwhile, if data taken over by another controller 0 does not exist (SP148: NO), the CPU 12 thereafter ends the read processing routine RT12 of the secondary volume 42 when a failure occurs in the controller 0 after replying to the split command shown in FIG. 29 (SP149).

With the storage system 1, if a failure occurs in the controller 1, the CPU 12 of the controller 0 performs the same processing as a matter of course.

Like this, with the storage system 1 of this embodiment, when the CPU 12 receives a split command from the host apparatus 2, it creates a secondary volume 42 as a backup volume of the primary volume 41, and sends a split command completion reply to the host apparatus 2 while the formatting of the secondary volume 42 and the replication from the primary volume 41 to the secondary volume 42 are incomplete.

Accordingly, it is possible to create a backup volume on a case-by-case basis only for the volumes that received a split command without having to maintain the pair status regarding all volumes including volumes that are not backed up, it is possible to effectively prevent the user from performing complex operations upon initialization, and a storage area that is greater than the actually used storage area is no longer required.

In addition, with the storage system 1 of this embodiment, if the CPU 12 receives a command from the host apparatus after sending the split command completion reply, it performs the formatting of the secondary volume 42 and the replication from the primary volume 41 to the secondary volume 42 based on the format management bitmap 22 and the replication management bitmap 23 so that commands from the host apparatus 2 can be processed even if a split command completion reply is sent to the host apparatus 2 while the formatting and replication are incomplete. In addition, since replication can be performed in the background without having to temporarily saving unreplicated data in a save area, commands from the host apparatus 2 can be processed without a buffer area.

With the storage system 1 of this embodiment, if a failure occurs to the controller 0 after the controller 0 sends a split command completion reply, the data stored in the controller 0, and the pair management table 21, format management bitmap 22 and replication management bitmap 23 of the controller 0 are taken over, and the formatting of the secondary volume 42 and the replication from the primary volume 41 to the secondary volume 42 are resumed. Thus, even if a failure occurs in the controller while the formatting and replication are incomplete, commands from the host apparatus 2 can be processed.

Figure 30:
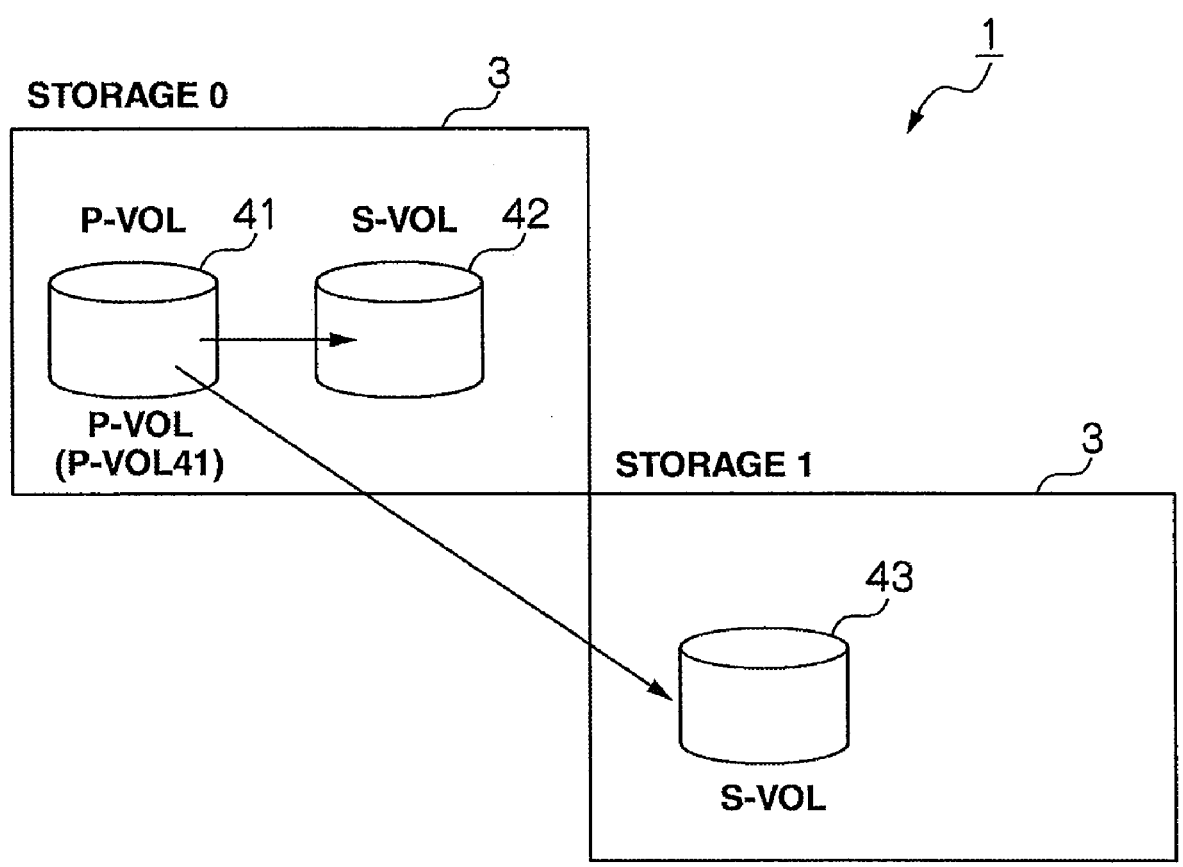
FIG. 30 is a block diagram showing the configuration of a storage system according to another embodiment.

FIG. 30 shows an example of the configuration of the storage system 1 according to another embodiment. The storage system 1 according to another embodiment is configured the same as the storage system 1 illustrated in FIG. 1 excluding the point of comprising another storage apparatus 3 at a remote location that is configured the same as the storage apparatus 3. In the ensuing explanation, for the sake of convenience, one storage apparatus 3 is referred to as the storage 0 and the other storage apparatus 3 is referred to as the storage 1.

The storage system 1 according to another embodiment performs the processing of FIG. 12 to FIG. 29 in the primary volume 41 and the secondary volume 42, includes a secondary volume 43 in the storage system 1, and performs the processing of FIG. 12 to FIG. 29 in the primary volume 41 and the secondary volume 43.

Figure 31:
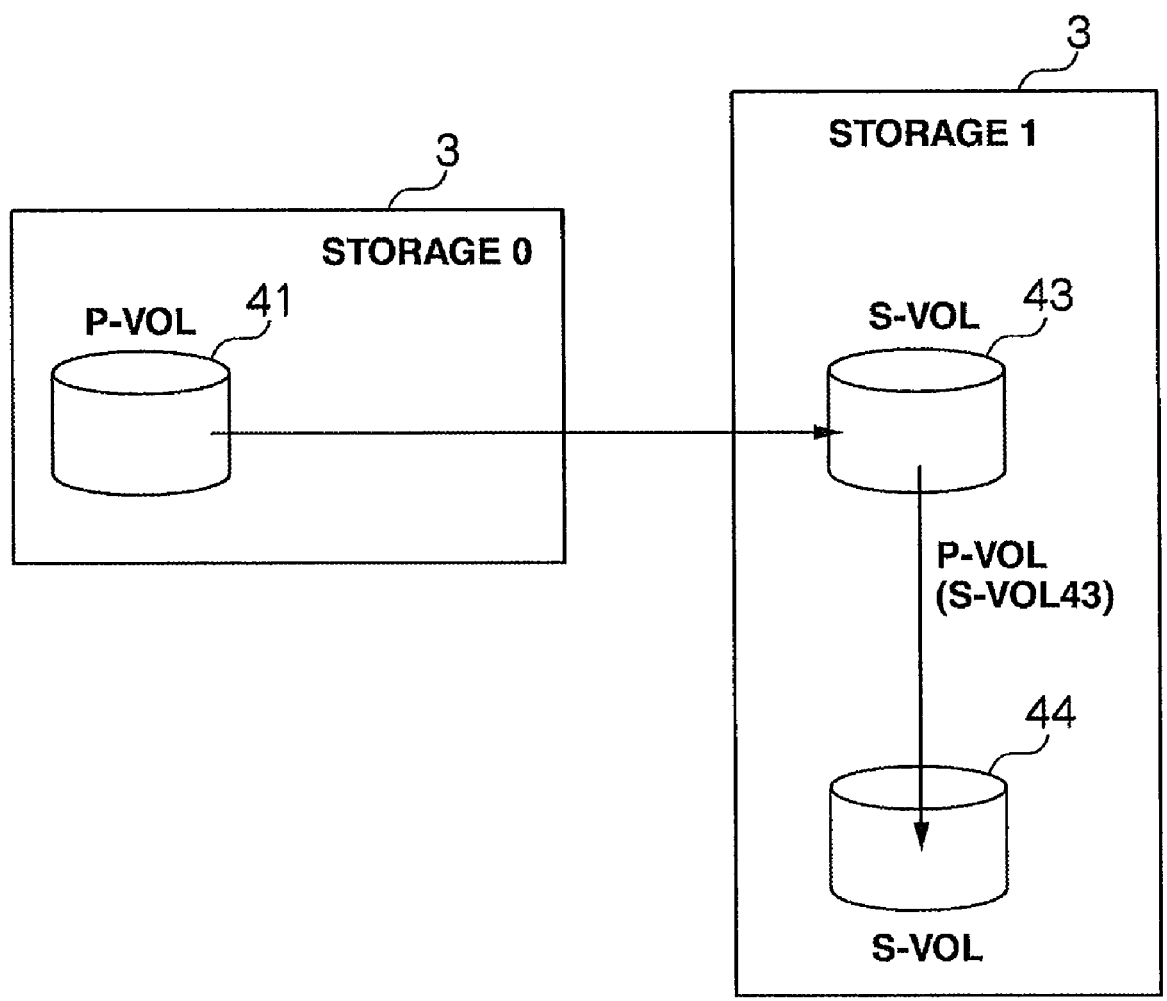
FIG. 31 is a block diagram showing the configuration of a storage system according to another embodiment.

FIG. 31 shows an example of the configuration of the storage system 1 according to another embodiment. The storage system 1 according to another embodiment is configured the same as the storage system 1 illustrated in FIG. 1 excluding the point of comprising another storage apparatus 3 at a remote location that is configured the same as the storage apparatus 3.

The storage system 1 according to another embodiment includes a secondary volume 43 in the storage 1, performs the processing of FIG. 12 to FIG. 29 in the primary volume 41 and the secondary volume 43, includes a secondary volume 44 in the storage 1, and performs the processing of FIG. 12 to FIG. 29 in the primary volume (secondary volume 43) and the secondary volume 44 with the secondary volume 43 as the primary volume.

Figure 32:
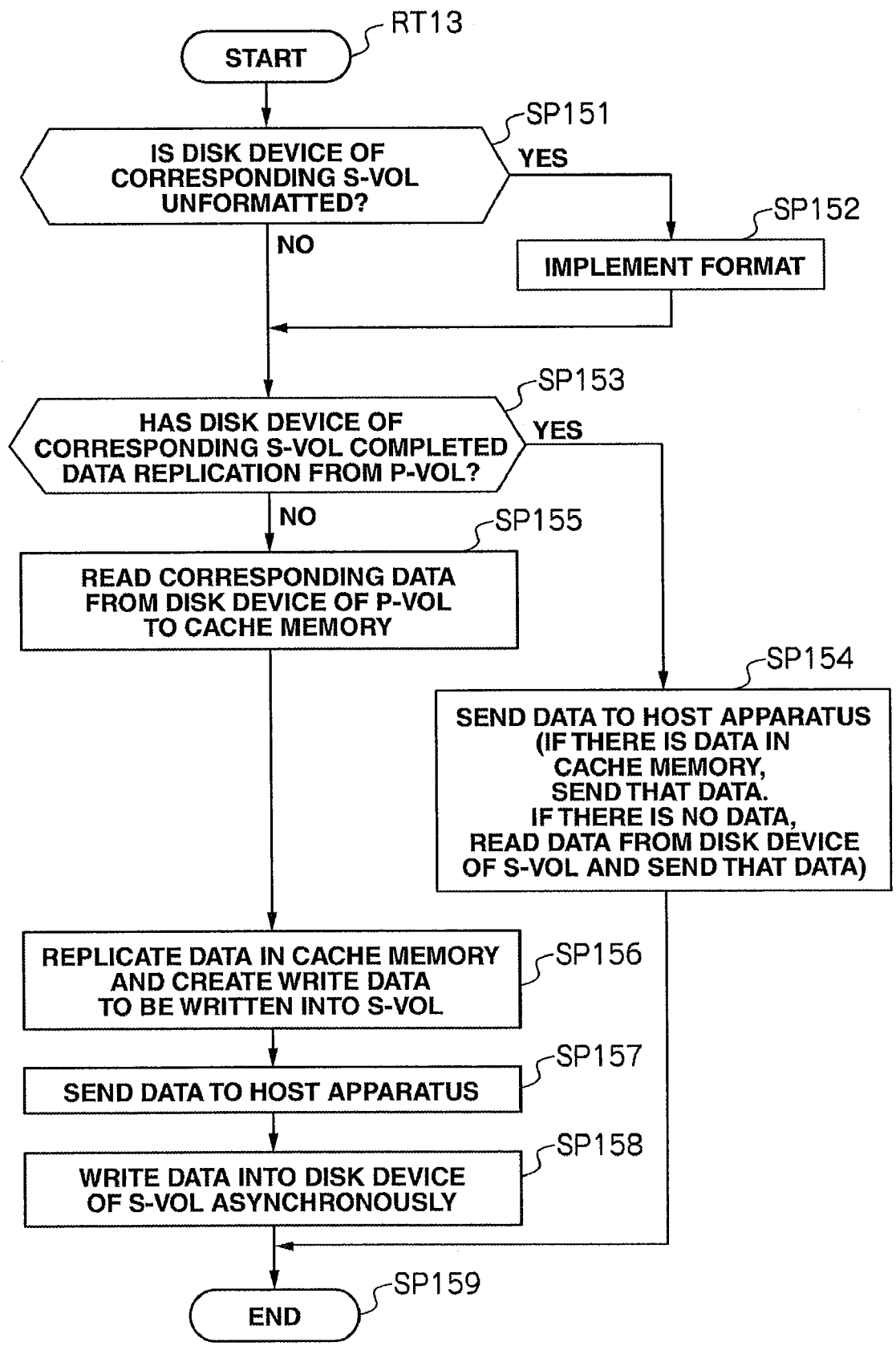
FIG. 32 is a flowchart showing an ownership takeover processing routine of a primary volume and a secondary volume.

FIG. 32 is an example of a flowchart showing the specific processing routine of the CPU 12 of the storage 1 concerning the read processing of the secondary volume 43 after replying to the split command of the storage 0 in the storage system 1.

When the CPU 12 of the storage 1 receives a read command of the secondary volume 43 from the host apparatus 2, it executes the control program 34 and according to the read processing routine RT13 of the secondary volume after replying to the split command of the storage 0 shown in FIG. 32, checks whether the formatting of the disk device 7 of the corresponding secondary volume 43 is incomplete (SP151). If the formatting of the disk device 7 of the corresponding secondary volume 43 is incomplete (SP151: YES), the CPU of the storage 1 formats the disk device 7 of the corresponding secondary volume 43 (SP152), and then proceeds to step SP153.

Meanwhile, if the formatting of the disk device 7 of the corresponding secondary volume 43 is not incomplete (SP151: YES), the CPU 12 of the storage 1 checks whether the disk device 7 of the corresponding secondary volume 44 has completed the data replication from the primary volume 41 (SP153).

If the disk device 7 of the corresponding secondary volume 44 has completed the data replication from the primary volume 41 (SP153: YES), the CPU 12 of the storage 1 sends data in the disk device 7 of the secondary volume 42 corresponding to the read command to the host apparatus 2 (SP154), and thereafter ends the read processing routine RT13 of the secondary volume after replying to the split command of the storage 0 shown in FIG. 32 (SP159). Here, the CPU 12 of the storage 1 sends the data if data exists in the cache memory 13 of the storage 1, and reads the data from the disk device 7 of the secondary volume 43 and then sends the data if such data does not exist in the cache memory 13 of the storage 1.

Meanwhile, if the disk device 7 of the corresponding secondary volume 44 has not completed the data replication from the primary volume 41 (SP153: NO), the CPU 12 of the storage 1 reads data of the corresponding area of the disk device 7 of the primary volume 41 into the cache memory 13 of the storage 1 (SP155). The CPU 12 of the storage 1 thereafter replicates the data in the cache memory 13 of the storage 1, and creates write data to be written into the secondary volume 43 (SP156).

Subsequently, the CPU 12 of the storage 1 sends the write data to be written into the CPU 12 as data corresponding to the read command to the host apparatus 2 (SP157). The CPU 12 of the storage 1 thereafter writes the write data to be written into the secondary volume 43 into the disk device 7 of the secondary volume 43 asynchronously (SP158).

Eventually, the CPU 12 thereafter ends the read processing routine RT13 of the secondary volume after replying to the split command of the storage 0 shown in FIG. 32 (SP159).

Like this, with the storage system 1 of another embodiment, if the CPU 12 of the storage 0 receives a command from the host apparatus 2 after sending a split command completion reply, it performs the formatting of the secondary volume 43 and the replication from the primary volume 41 to the secondary volume 43 based on the format management bitmap 22 and the replication management bitmap 23. Thus, even if the secondary volume 43 exists in another storage apparatus 3, commands from the host apparatus 2 can be processed.

The present invention can be broadly applied to storage apparatuses that perform backup of volumes storing data.

What is claimed is:

1. A storage apparatus including a first volume for storing data sent from a host apparatus and for performing backup of the first volume, comprising:
   a plurality of disk drives; and
   a control unit providing a first volume and a second volume to the host apparatus, each of the first volume and the second volume being defined by a plurality of segments on the plurality of disk drives,
   wherein the control unit creates a second volume as a backup volume of the first volume upon receiving a backup command regarding the first volume from the host apparatus, and sends a completion reply responsive to the backup command to the host apparatus while formatting of the second volume and replication from the first volume to the second volume are incomplete,
   wherein after sending the completion reply responsive to the backup command, and upon receiving a write command to write to a first segment of the first volume, the control unit:
      sends a completion reply responsive to the write command after storing data of the write command to a cache memory;
      makes a determination as to whether data of the first segment is replicated based on a replication management bitmap;
      when the determination indicates that data of the first segment is not replicated, sets a write inhibition flag corresponding to the first segment to "ON", replicates the data of the first segment to the second segment in the second volume corresponding to the first segment, changes the write inhibition flag corresponding to the first segment to "OFF", and writes the data of the write command stored in the cache memory to the first segment; and
      when the determination indicates that the data of the first segment is replicated, writes the data of the write command stored in the cache memory to the first segment.

2. The storage apparatus according to claim 1, wherein after sending the completion reply responsive to the backup command, and upon receiving a write command to write to the second volume, the control unit sends a completion reply while processing of the write command is incomplete, and writes the data of the write command to the second volume based on a format management bitmap and the replication management bitmap.

3. The storage apparatus according to claim 1, wherein after sending a completion reply responsive to the backup command, and upon receiving a read command to read from the first volume, the control unit sends data corresponding to the read command to the host apparatus when the data corresponding to the read command exists in the cache memory, reads the data from the corresponding second volume, and sends the data to the host apparatus when the data corresponding to the read command does not exist in the cache memory.

4. The storage apparatus according to claim 1, wherein after sending a completion reply response to the backup command, and upon receiving a read command to read from the second volume, the control unit makes a determination as to whether data corresponding to the read command has been replicated in the second volume, and
wherein when the determination indicates that the data has not been replicated in the second volume, the control unit reads the data from the corresponding first volume, sends the data to the host apparatus, and writes the data to the second volume based on a format management bitmap.

5. The storage apparatus according to claim 1,
wherein the control unit comprises:
a first control unit; and
a second control unit,
wherein, when a failure occurs in the first control unit after the first control unit sends the completion reply responsive to the backup command, the second control unit takes over the data stored in the first control unit, a pair management table for managing the pair status of the first volume and the second volume of the first control unit, a format management bitmap and the replication management bitmap, and resumes the formatting of the second volume and the replication from the first volume to the second volume.

6. The storage apparatus according to claim 5,
wherein the second control unit makes a determination as to whether a completion reply responsive to a write command to write to a first volume corresponding to the data taken over from the first control unit has been sent to the host apparatus, and when the data taken over from the first control unit has been sent to the host apparatus, the second control unit writes the data of the write command to the first volume based on the format management bitmap and the replication management bitmap.

7. The storage apparatus according to claim 5,
wherein the second control unit makes a determination as to whether the data taken over from the first control unit corresponding to a read command to read from a second volume has been replicated in the second volume, and when the data taken over from the first control unit has not been replicated, the second control unit writes the data of the read command to the second volume based on the format management bitmap.

8. A control method of a storage apparatus including a first volume for storing data sent from a host apparatus and for performing backup of the first volume, a plurality of disk drives, and a control unit, the method comprising:

providing, by the control unit, a first volume and a second volume to the host apparatus, each of the first volume and the second volume being defined by a plurality of segments on the plurality of disk drives;

creating, by the control unit, a second volume as a backup volume of the first volume upon receiving a backup command regarding the first volume from the host apparatus; and sending, by the control unit, a completion reply responsive to the backup command to the host apparatus while formatting of the second volume and replication from the first volume to the second volume are incomplete, wherein after sending the completion reply responsive to the backup command, and upon receiving a write command to write to a first segment of the first volume, the control unit performs steps of:

sending a completion reply responsive to the write command after storing data of the write command to a cache memory;

making a determination as to whether data of the first segment is replicated based on a replication management bitmap;

when the determination indicates that data of the first segment is not replicated, setting a write inhibition flag corresponding to the first segment to "ON", replicating the data of the first segment to the second segment in the second volume corresponding to the first segment, changing the write inhibition flag corresponding to the first segment to "OFF", and writing the data of the write command stored in the cache memory to the first segment; and when the determination indicates that the data of the first segment is replicated, writing the data of the write command stored in the cache memory to the first segment.

9. The storage apparatus control method according to claim 8, wherein after sending the completion reply responsive to the backup command, and upon receiving a write command to write to the second volume, a completion reply is sent while processing of the write command is incomplete, and the data of the write command is written to the second volume based on a format management bitmap and the replication management bitmap.

10. The storage apparatus control method according to claim 8, wherein after sending a completion reply responsive to the backup command, and upon receiving a read command to read from the first volume, data corresponding to the read command is sent to the host apparatus when the data corresponding to the read command exists in the cache memory, the data from the corresponding second volume is read and sent to the host apparatus when the data corresponding to the read command does not exist in the cache memory.

11. The storage apparatus control method according to claim 8, wherein after sending a completion reply responsive to the backup command, and upon receiving a read command to read from the second volume, a determination is made as to whether data corresponding to the read command has been replicated in the second volume, and wherein when the determination indicates that the data has not been replicated in the second volume, the data from the corresponding first volume is read and sent to the host apparatus, and the data is written to the second volume based on a format management bitmap.

12. The storage apparatus control method according to claim 8, wherein the control unit includes a first control unit and a second control unit, and wherein when a failure occurs in the first control unit after the first control unit sends the completion reply responsive to the backup command, the second control unit takes over the data stored in the first control unit, a pair management table for managing the pair status of the first volume and the second volume of the first control unit, a format management bitmap and the replication management bitmap, and resumes the formatting of the second volume and the replication from the first volume to the second volume.

13. The storage apparatus control method according to claim 12, wherein a determination is made as to whether a completion reply responsive to a write command to write to a first volume corresponding to the data taken over from the first control unit has been sent to the host apparatus, and when the data taken over from the first control unit has been sent to the host apparatus, the data of the write command is written to the first volume based on the format management bitmap and the replication management bitmap.

14. The storage apparatus control method according to claim 12, wherein a determination is made as to whether the data taken over from the first control unit corresponding to a read command to read from a second volume has been replicated in the second volume, and when the data taken over from the first control unit has not been replicated, the data of the read command is written to the second volume based on the format management bitmap.

* * * * *